United States Patent
Okamura

(10) Patent No.: US 10,301,495 B2
(45) Date of Patent: May 28, 2019

(54) INK JET RECORDING METHOD AND INK JET RECORDING APPARATUS

(71) Applicant: CANON KABUSHIKI KAISHA, Tokyo (JP)

(72) Inventor: Daiji Okamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/606,037

(22) Filed: May 26, 2017

(65) Prior Publication Data

US 2017/0348967 A1     Dec. 7, 2017

(30) Foreign Application Priority Data

Jun. 1, 2016 (JP) .................................. 2016-109999
May 22, 2017 (JP) .................................. 2017-100598

(51) Int. Cl.
    *C09D 11/38*     (2014.01)
    *C09D 11/322*     (2014.01)

(52) U.S. Cl.
    CPC ............ *C09D 11/38* (2013.01); *C09D 11/322* (2013.01)

(58) Field of Classification Search
    CPC . B41J 2/01; B41J 2/165; B41J 2/16517; B41J 2/1657; B41J 2/16573; C09D 11/38; C09D 11/322
    USPC ....................................................... 347/100
    See application file for complete search history.

(56) References Cited

U.S. PATENT DOCUMENTS

| | | | |
|---|---|---|---|
| 7,144,452 B2 | 12/2006 | Takayama et al. | |
| 7,160,372 B2 | 1/2007 | Yoshizawa et al. | |
| 7,198,664 B2 | 4/2007 | Mafune et al. | |
| 7,198,665 B2 | 4/2007 | Nakamura et al. | |
| 7,201,791 B2 | 4/2007 | Okamura et al. | |
| 7,247,194 B2 | 7/2007 | Okamura et al. | |
| 7,247,196 B2 | 7/2007 | Sato et al. | |
| 7,270,701 B2 | 9/2007 | Jinnou et al. | |
| 7,297,197 B2 | 11/2007 | Jinnou et al. | |
| 7,553,358 B2 | 6/2009 | Okamura et al. | |
| 7,566,362 B2 | 7/2009 | Mori et al. | |
| 7,611,571 B2 | 11/2009 | Yamashita et al. | |
| 7,618,484 B2 | 11/2009 | Fujimoto et al. | |
| 7,682,433 B2 | 3/2010 | Yanagimachi et al. | |

(Continued)

FOREIGN PATENT DOCUMENTS

| | | |
|---|---|---|
| JP | 2007-152830 A | 6/2007 |
| JP | 2008-001891 A | 1/2008 |
| JP | 2010-143147 A | 7/2010 |

*Primary Examiner* — Huan H Tran
*Assistant Examiner* — Alexander D Shenderov
(74) *Attorney, Agent, or Firm* — Venable LLP

(57) ABSTRACT

To provide an ink jet recording method excellent in a fixability of an image, capable of recording an image excellent in optical density, and excellent in a recoverability, when it uses a recording apparatus having a line head. This method records an image by using an ink jet recording apparatus equipped with a line head having an ejection nozzle of a pigment-containing aqueous ink and a mechanism for recovering an ejection state of the aqueous ink from the nozzle and applying the ink to a recording medium. The pigment has an average particle diameter of 80 nm or more, the ink has a dynamic surface tension of 55 mN/m or less at a lifetime of 10 milliseconds, the recovery mechanism includes a mechanism for causing the ink in the nozzle to flow, and the viscosity of the ink in the nozzle is reduced.

17 Claims, 6 Drawing Sheets

(56) References Cited

U.S. PATENT DOCUMENTS

| | | |
|---|---|---|
| 7,699,924 B2 | 4/2010 | Mafune et al. |
| 8,016,932 B2 | 9/2011 | Okamura et al. |
| 8,029,612 B2 | 10/2011 | Ishii et al. |
| 8,123,846 B2 | 2/2012 | Yamakami et al. |
| 9,169,413 B2 | 10/2015 | Shiiba et al. |
| 9,452,608 B2 | 9/2016 | Okamura et al. |
| 2008/0018722 A1 | 1/2008 | Mafune et al. |
| 2008/0036840 A1* | 2/2008 | Hakiri ............ C09D 11/324 347/100 |
| 2009/0079797 A1* | 3/2009 | Yokouchi ........ B41J 2/14048 347/63 |
| 2009/0165675 A1* | 7/2009 | Aoyama ........... C09D 11/324 106/31.86 |
| 2009/0170986 A1* | 7/2009 | Brust ............... C09D 11/326 524/104 |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus used therefor.

Description of the Related Art

Ink jet recording apparatuses have recently been used increasingly in offices and the like with their advantages such as low electric power, low cost, and saved space. As a scanning type of a recording head used in ink jet recording apparatuses, a serial type can be given as one example. In the serial type, an image is recorded by moving a recording head in repetition in a direction (sub-scanning direction) orthogonal to a paper feed direction (main scanning direction). Since the serial type recording head is relatively small, the recording apparatus itself can have a reduced size.

In recent years, for further improvement in a recording speed (throughput), a recording apparatus using, as a recording head, a line head type one in which an arrangement width of ejection orifices is increased to a width corresponding to the maximum width of a recording medium has been developed (Japanese Patent Application Laid-Open No. 2010-143147). In this line head type, different from the serial type, the recording head is not moved but only paper is conveyed so that it is advantageous for improving a recording speed.

With improvement in recording speed, however, blots (smears) may appear during continuously recording due to the contact of a second recorded product with a first recorded product before the recorded portion of the first record product becomes dry. In order to suppress appearance of such blots, for example, there is a proposal of an ink capable of controlling its dynamic surface tension at a lifetime of 5,000 milliseconds and thereby recording a well fixed image (Japanese Patent Application Laid-Open No. 2008-001891). Further, for documents used in offices or the like, there is an increasing demand for the density (optical density) of an image to be recorded. Ink jet recording apparatuses to be used in offices can necessarily record, on plain paper, an image or character with a high optical density.

Compared with the serial head, the line head has a significant problem in performance of recovering a normal ejection state of an ink (recoverability) when non-ejection or the like occurs. Namely, in the line head, a recording head is fixed, so that a recovering operation such as preliminary ejection cannot be performed frequently. As a recovering mechanism used in the line head, there is proposed, for example, a recovering mechanism for forcibly ejecting an ink from a nozzle by pressurization or suction and thereby recovering the ejection state of the ink (Japanese Patent Application Laid-Open No. 2007-152830).

SUMMARY OF THE INVENTION

For recording an image excellent in optical density, it is important to design an ink to efficiently leave a pigment on a recording medium. More specifically, there is a method of leaving a large amount of a pigment in the vicinity of the surface of a recording medium by controlling the surface tension of an ink and retarding permeation of the ink to a recording medium. For improving a fixability of an image, on the other hand, it is important to control the surface tension of an ink and promptly infiltrate a liquid component of the ink, which has been applied to a recording medium, into the recording medium. This means that when recording is performed using an ink jet recording apparatus using a pigment ink, there is a trade-off relationship between the optical density of an image and the fixability of the image.

Further, in an ink jet recording apparatus equipped with a line head, it is necessary to accelerate the permeation of an ink and enhance the fixability of the image. When such ink jet recording apparatus equipped with a line head is used, therefore, the image recorded using it is likely to have a further reduced optical density. Even the ink proposed in Japanese Patent Application Laid-Open No. 2008-001891 is found to have difficulty in achieving a high fixability which is required with a recent drastic increase in recording speed.

It is necessary to design an ink, attaching great importance to color developability of an image in order to improve its optical density while keeping its fixability during recording an image by using the ink jet recording apparatus equipped with a line head. However, when an ink designed while attaching great importance to color developability is used, the ink jet recording system is likely to have deteriorated reliability such as reduced recoverability.

The recovery mechanism proposed in Japanese Patent Application Laid-Open No. 2007-152830 is a mechanism of filling a recording head with a fresh ink while discharging bubbles from an ink flow path by pressurization or suction of the ink. Efficient recovery however cannot be achieved easily when an excessively thickened ink firmly adheres to the inside of a nozzle and remains therein. Simple improvement in the flow rate of the ink by pressurization or the like only accelerates ejection of the ink from a nozzle to which no ink has firmly adhered but does not contribute to smooth removal of the ink from a nozzle to which it has firmly adhered. Further, in the recovery mechanism proposed in Japanese Patent Application Laid-Open No. 2007-152830, each head must be provided with two caps, that is, a hermetically sealing cap used at the time of suction operation and a cap serving as a receiver of preliminary ejection, which complicates the structure of the apparatus.

An object of the invention is therefore to provide an ink jet recording method excellent in a fixability of an image, capable of recording an image excellent in optical density, and excellent in a recoverability when using a recording apparatus equipped with a line head. Another object of the invention is to provide an ink jet recording apparatus to be used for the above-described ink jet recording method.

The above-described objects are achieved by the following invention. According to the invention, provided is an ink jet recording method which records an image by applying an ink containing a pigment on a recording medium using the ink jet recording apparatus equipped with a line head having a nozzle that ejects the ink and a recovery mechanism of the nozzle; the pigment has an average particle diameter of 80 nm or more; the aqueous ink has a dynamic surface tension of 55 mN/m or less at a lifetime of 10 milliseconds; the recovery mechanism includes an ink flow mechanism for making the aqueous ink in the nozzle to flow, and a viscosity of the aqueous ink in the nozzle is reduced at the time of operating the ink flow mechanism.

The invention enables to provide an ink jet recording method excellent in a fixability of an image, capable of recording an image excellent in optical density, and excellent in a recoverability when using a recording apparatus equipped with a line head. In addition, the invention enables to provide an ink jet recording apparatus to be used for the above-described ink jet recording method.

Further features of the present invention will become apparent from the following description of exemplary embodiments with reference to the attached drawings.

BRIEF DESCRIPTION OF THE DRAWINGS

FIGS. 3A and 3B schematically show one example of a line head, in which FIG. 3A is a perspective view and FIG. 3B is an exploded perspective view.

FIGS. 4A and 4B show one example of a wiping mechanism, in which FIG. 4A is a perspective view and FIG. 4B is a schematic view.

DESCRIPTION OF THE EMBODIMENTS

Figure 1:
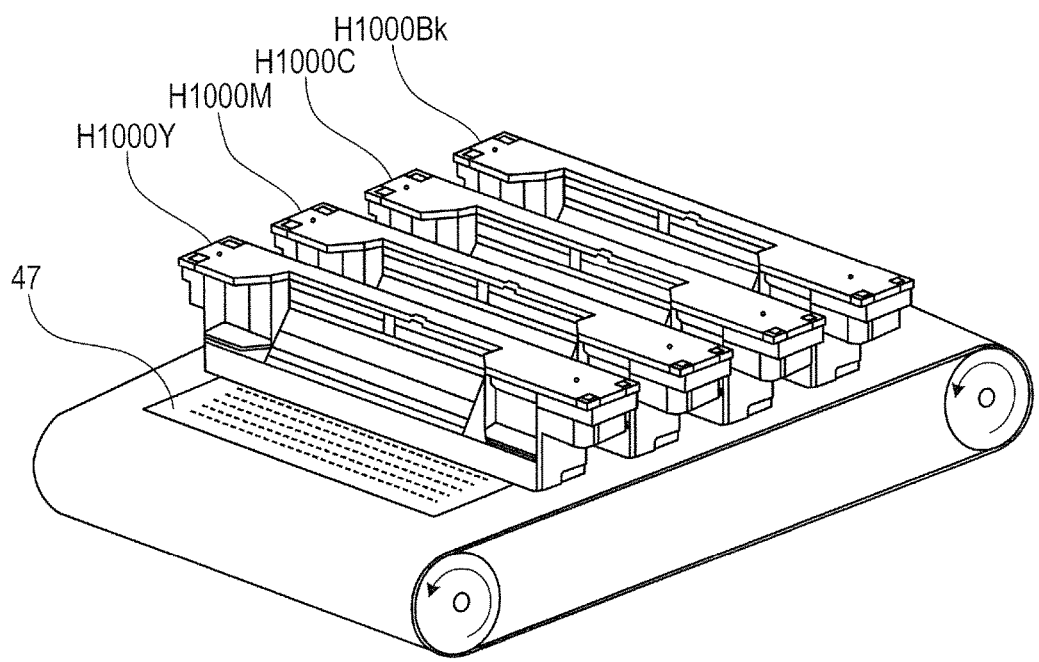
FIG. 1 is a conceptual diagram of recording an image by a line head.

Preferred embodiments of the present invention will now be described in detail in accordance with the accompanying drawings. The invention will hereinafter be described in further detail by preferred embodiments. In the invention, when a compound is a salt, the salt in an ink is dissociated into ions, but it is expressed "the ink contains a salt" for convenience sake. An aqueous ink for ink jet may be referred to as "ink" simply. The physical property values are values at normal temperature (25° C.) unless otherwise particularly specified.

<Ink Jet Recording Method>

The ink jet recording method of the invention is an ink jet recording method which records an image by applying an ink containing a pigment on a recording medium using the ink jet recording apparatus equipped with a line head having a nozzle that ejects the ink and a recovery mechanism of the nozzle. The pigment has an average particle diameter of 80 nm or more and the ink has a dynamic surface tension of 55 mN/m or less at a lifetime of 10 milliseconds. Further, the recovery mechanism includes an ink flow mechanism for making the ink in the nozzle flow and the viscosity of the ink in the nozzle is reduced at the time of operation of the ink flow mechanism.

As described above, for expanding the use of ink jet recording apparatuses in offices and the like, improvement in recording speed (throughput) comparable to that of an electro photographic system recording apparatus is eagerly demanded. In order to enhance a recording speed when a serial type recording head is used, required are an increase in a moving speed of the recording head in a sub-scanning direction and an increase in the number of ejection times per nozzle (meaning an increase in ejection frequency). An increase in ejection frequency however imposes various limitations such as mechanical limitation and delay in supply (refill) of the ink from an ink storage portion to an ejection orifice. There is therefore a limitation on the improvement of the recording speed of an ink jet recording apparatus mounting a serial type recording head.

With the foregoing situation in view, there has recently been developed a recording apparatus adopting a line type recording head (which will hereinafter also be called "line head") in which ejection orifices (nozzles) for ejecting an ink are arranged over the whole width of a recording medium (maximum paper width). It is not necessary to move the recording head because the number of ejection orifices arranged in the line head corresponds to the maximum paper width of the recording medium, so that this apparatus has an advantage of high speed recording. In other words, in the recording apparatus adopting a line head, moving of the recording head in a direction (main scanning direction) orthogonal to the conveying direction (sub-scanning direction) of the recording medium is not necessary. An image can therefore be recorded by "single pass", that is, only one passage of a unit region of the recording medium immediately under the recording head and time required for recording can be reduced.

The present inventors investigated further high speed recording by combining the ink jet recording apparatus adopting a line head and a conventional ink jet ink. As a result, they have found that a new problem as described below occurs.

As described above, there is a trade-off relationship between the optical density of an image recorded using an ink jet recording apparatus and a fixability of the image. This trade-off relationship tends to be more marked by further improvement in recording speed. The fixability of the image has correlation with a permeation behavior of an ink after it is supplied to a recording medium and an image recorded with an ink with high permeability to the recording medium tends be fixed well. Continuously recording with an ink having a low permeation speed to a recording medium is likely to cause a blot called "smear" because before an ink supplied to the first page of the recording medium dries, the next recording product touches it. Further, for recording on both sides of a recording medium (so-called duplex printing is performed), the recording medium immediately after recording should be inserted in a reversing mechanism in the apparatus in order to reverse the recording medium. Therefore, before the ink becomes dry, the recorded portion touches a portion of the reversing mechanism of the recording apparatus and an unfixed image may inevitably blot the rear surface of the recording medium or another recording medium.

In order to obtain a recorded image having a high optical density and being fixed well, it is necessary to design an ink having excellent color developability while imparting it with high permeability. Examples of a method of designing a pigment ink excellent in color developability include a method of imparting a pigment with a function of improving color developability (for example, increasing an average particle diameter of the pigment) and a method of increasing a pigment content. Using inks having color developability improved by the above methods are likely to deteriorate the reliability of an ink jet recording apparatus. For example, a pigment with a large average particle diameter causes a problem related to sedimentation. When the ink partially thickened due to sedimentation of pigment particles is supplied to a nozzle, it is likely to lower an ink ejection property. Also an increase in pigment content is likely to cause a problem related to an increase in viscosity of the ink.

In particular, the recording head of the ink jet recording apparatus equipped with a line head has the number of nozzles corresponding to the maximum width of a recording medium, so that deviation may occur between used nozzles and unused nozzles, depending on a recording pattern. For example, when the similar pattern is continuously recorded while supplying a nozzle with an ink containing settled out pigment particles or an ink having a high pigment concentration, the nozzle corresponding to an unrecorded portion does not eject the ink continuously. When ejection of the ink is stopped continuously, a liquid component of the ink evaporates from an ejection orifice of the nozzle and the ink therein thickens further.

An ink jet recording apparatus is usually equipped with a recovery mechanism for keeping the fresh state of an ink in a nozzle (state without sedimentation or evaporation) and for recovering a normal ejection state of the ink from the nozzle. For example, after continuously recording to some extent or when the apparatus is left under an ejection suspended state for a long period of time, the recovery mechanism is actuated to recover the ejection state of the ink from the nozzle. It is however difficult to recover the ejection state of the ink by normal recovery operation when the ink thickens extremely in the nozzle or firmly adheres thereto.

In continuously recording using the serial head, the recording head ejects a thickened ink as preliminary ejection at a position not facing to the recording medium while moving the recording head in a sub-scanning direction in repetition. Therefore, extreme thickening of the ink in the nozzle hardly occurs and the recovery of an ejection state does not become such a serious problem as that in the line head. When an ink having a viscosity of from 1 to 2 mPa·s under an evaporation-free state is used in an ordinary serial head, thickening to about 10 mPa·s occurs. In such a level, the ejection state can be recovered sufficiently by preliminary ejection during recording scanning.

In continuously recording on a recording medium such as roll paper while using a line head, on the other hand, the recording head is always at a position facing to the recording medium. Ejection of a thickened ink by ejection therefore supplies an unnecessary ink to the recording medium and it deteriorates an image quality, making it difficult to perform such a recovery operation. When an ink having a viscosity of from 1 to 2 mPa·s under an evaporation-free state as in the above case is used for an ordinary line head, the viscosity increases and significantly exceeds 10 mPa·s and it usually reaches even about 20 mPa·s. The viscosity partially becomes as high as 100 Pa·s. When it reaches such a level, recovery cannot be expected by the conventional recovery operation.

The present inventors used an ink jet recording apparatus equipped with a line head and ejected an ink containing a pigment settled out after it was left alone for a long period of time and an ink having a high pigment content to continuously record the similar pattern. During continuously recording, a nozzle check pattern was recorded. It has revealed that non-ejection or irregular ejection occurred in the unused nozzle. Further, a recovery operation was performed to overcome the non-ejection or irregular ejection of an ink, leading to failure in recovery of all the nozzles that had caused non-ejection or irregular ejection. The present inventors have presumed that such phenomena occur according to the following mechanism.

When the similar pattern is continuously recorded, in a line head having nozzles filled with an ink, the ink is ejected regularly from the nozzles to be used for recording, so that the ink in the nozzles does not thicken considerably. In unused nozzles that do not eject the ink, on the other hand, the ink in the nozzles thickens with evaporation of its liquid component. In the case where the ink used is a normal one, even when the ink has thickened in the nozzle, the ejection state can be recovered by actuating a recovery mechanism provided in an ordinary ink jet recording apparatus to eject the thickened ink and supply an ink into the nozzle from an ink storage portion unit. An ink containing a settled out pigment after left alone for a long period of time or an ink containing a pigment at high concentration thickens markedly in the nozzle or even worse, it firmly adheres thereto. The recovery mechanism is actuated in repetition in spite that the ink has thickened markedly in the nozzle or has firmly adhered thereto, the ink preferentially flows through easily recoverable nozzles, while smooth flow of the ink is interrupted in the other nozzles. As a result, the ink that has thickened markedly or has firmly adhered to the unused nozzles remains therein and is presumed to cause non-ejection or irregular ejection.

The present inventors have investigated an ink jet recording method capable of suppressing deterioration of a recoverability even when the similar pattern is continuously recorded at high speed with a pigment ink excellent in a fixability and capable of recording an image having a high optical density. As a result, the inventors have found that excellent recoverability can be achieved by using an ink jet recording apparatus equipped with a recovery mechanism including an ink flow mechanism for making the ink in the nozzle flow and reducing the viscosity of the ink in the nozzle at the time of operating this ink flow mechanism.

The viscosity of an ink in a nozzle can be reduced, for example, by a method of driving a piezoelectric element at the time of operating an ink flow mechanism to cause deformation, mechanically causing a pressure change in the nozzle, and thereby oscillating the ink in a nozzle. As another example, the viscosity of an ink in a nozzle can be reduced by applying thermal energy to the ink in a nozzle at the time of operating an ink flow mechanism to heat the ink in a nozzle.

As described above, the present inventors have found an ink jet recording method of the invention capable of satisfying improvement in both a fixability of an image and optical density of an image in high-speed recording of the image by using an ink jet recording apparatus equipped with a line head. The present inventors have also found that a new problem, that is, deterioration in a recoverability caused during recording an image with high optical density can be overcome by an ink jet recording apparatus of the invention equipped with a unit for reducing the viscosity of an ink in a nozzle at the time of operating an ink flow mechanism.

(Ink Jet Recording Apparatus)

An ink jet recording apparatus to be used in the ink jet recording method of the invention is equipped with a pigment-containing ink, a line head having a nozzle filled with the ink and ejecting the ink therefrom, and a recovery mechanism for recovering the ejection state of the ink from the nozzle. The pigment in the ink with which the nozzle is filled has an average particle diameter of 80 nm or more and has a dynamic surface tension of 55 mN/m or less at the lifetime of 10 milliseconds. The recovery mechanism includes an ink flow mechanism for making the ink in the nozzle flow. It is equipped further with a unit for reducing the viscosity of the ink in the nozzle at the time of operating the ink flow mechanism. The ink jet recording apparatus of the invention will hereinafter be described in detail referring to some drawings.

Figure 2:
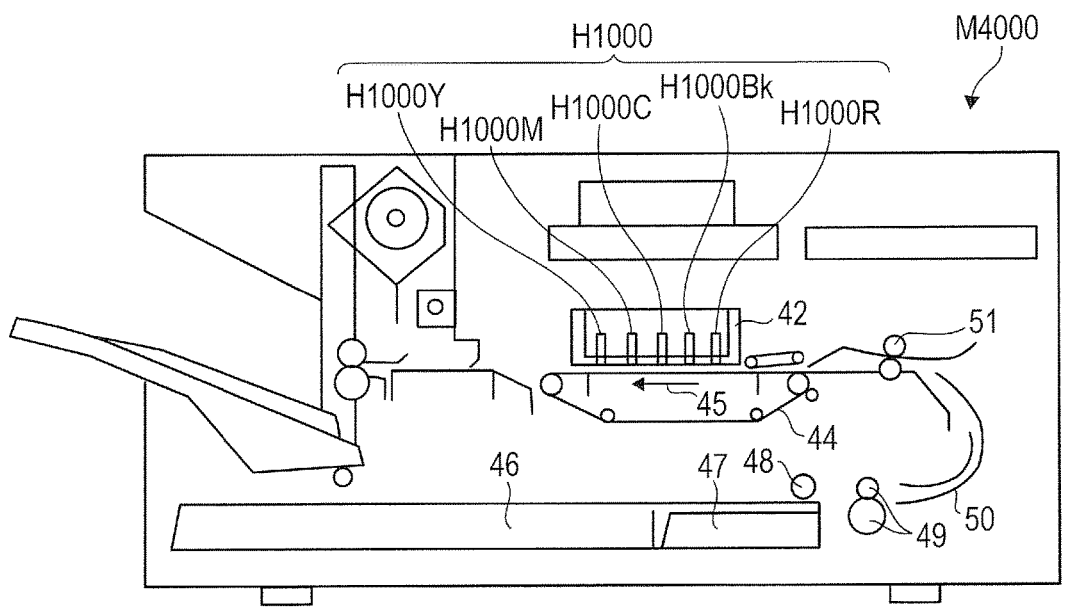
FIG. 2 is a schematic view showing one example of an ink jet recording apparatus.

FIG. 1 is a conceptual diagram of recording an image by a line head; and FIG. 2 is a schematic view showing one example of an ink jet recording apparatus. In a recording apparatus M4000 shown in FIG. 2, a line head (recording head H1000) is fixed to a recording apparatus body and a method of recording while conveying a recording medium 47 in a direction of an arrow 45 is adopted. The recording apparatus M4000 is equipped with, for example, a recording head H1000Y for yellow ink, a recording head H1000M for magenta ink, a recording head H1000C for cyan ink, and a recording head H1000Bk for black ink (FIG. 1).

The recording heads H1000Y to H1000R shown in FIG. 2 are fixed by a recording head holder 42 mounted in the recording apparatus M4000. FIGS. 1 and 2 show a structure in which yellow, magenta, cyan and black colors and a reaction liquid are ejected from recording heads, respectively. Needless to say, another structure may be employed in which an image is recorded by ejecting a plurality of inks and a reaction liquid from a plurality of ejection orifice arrays provided on one recording element substrate, respectively.

The ink jet recording apparatus may be equipped with a unit for applying, to a recording medium, a reaction liquid containing a component causing aggregation of a coloring material. Examples of the unit for applying the reaction liquid to a recording medium include a unit for applying the reaction liquid to a recording medium by a method of application and a unit for applying the reaction liquid to a recording medium by an ejection method. In the unit for applying the reaction liquid to a recording medium by a method of application, the reaction liquid is applied to the recording medium, for example, by using a conventionally known application member such as roller. In the unit for applying the reaction liquid to a reaction medium by an ejection method, the reaction liquid is applied to the recording medium, for example, by using an ejection device such as the line head for reaction liquid (recording head H1000R) as shown in FIG. 2. When four recording heads corresponding to inks of four colors are provided, respectively, as shown in FIG. 1, another unit for applying the reaction liquid to a recording medium can be provided. In the invention, it is preferred to apply the reaction liquid to a recording medium by a method of application or the like and then apply the inks, which have been ejected from the recording heads, to the recording medium.

A paper feed cassette 46 has therein one or more recording media 47 such as plain paper and it is detachably attached to the recording apparatus body. A pickup roller 48 is a member for sending one sheet on the topmost surface of the recording media 47 housed in the paper feed cassette 46. A conveying roller 49 is a member for conveying the recording media 47 sent by the pickup roller 48 to a conveying path 50. A conveying roller 51 arranged on the outlet side of the conveying path 50 is a member for conveying the recording media 47 toward the recording head H1000 while having the media on a conveying belt 44.

Figure 3A:
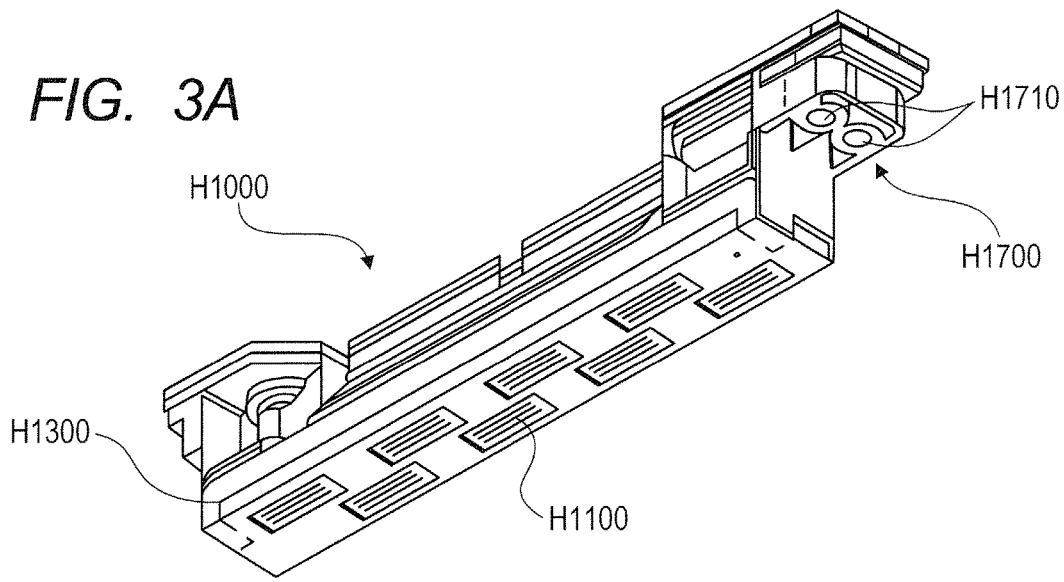
Figure 3B:
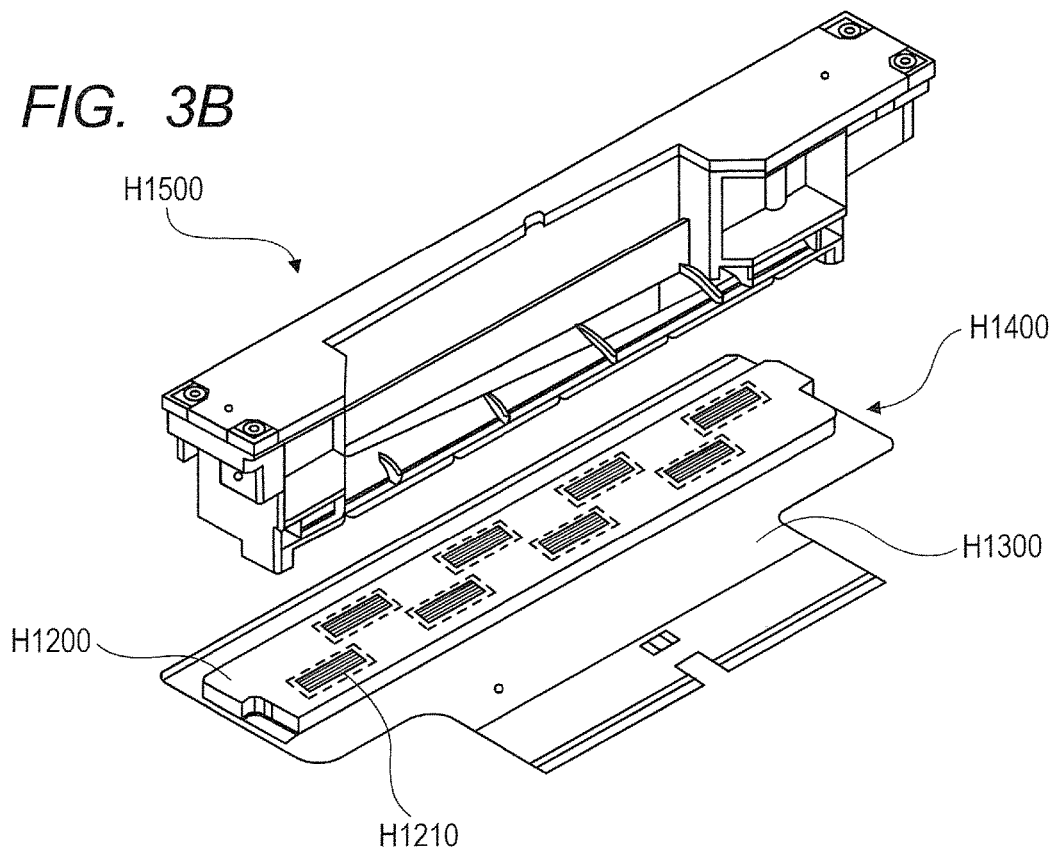

FIGS. 3A and 3B schematically show one example of a line head, in which FIG. 3A is a perspective view and FIG. 3B is an exploded perspective view. As shown in FIGS. 3A and 3B, the line head (recording head H1000) is equipped with a recording element unit H1400 and an ink supply unit H1500 which is a liquid supply unit for supplying an ink to the recording element unit H1400. The ink supply unit H1500 is equipped with a connection portion H1700 having therein a connection port H1710 to be connected with the outside for supplying the ink to an ink chamber (not shown) from the outside such as the recording apparatus. The recording element unit H1400 is comprised of a recording element substrate H1100, a support substrate H1200, and a wiring member H1300.

The support substrate H1200 is a member for holding and fixing the recording element substrate H1100 and the wiring member H1300 and it has therein an ink supply hole H1210 for supplying the recording element substrate H1100 with an ink supplied from the ink supply unit H1500. A plurality of recording element substrates H1100 are arranged and fixed on the main surface of the support substrate H1200 with predetermined positional accuracy. The plurality of recording element substrates H1100 is arranged in staggered manner on the support substrate H1200 such that their ejection orifices are arranged continuously along a direction of ejection orifice array between the recording element substrates H1100 adjacent to each other. Thus, since the recording element substrates H1100 are arranged while overlapping the ejection orifices at the joint of the adjacent recording element substrates H1100 to enable correction of the influence of the misalignment of the recording element substrates on an image, a full line type recording head having a long recording width can be achieved.

The wiring member H1300 is electrically connected with each of the recording element substrates H1100 so as to send electrical signals or power for driving a recording element provided on the recording element substrate H1100 from the outside of the recording head H1000 (recording apparatus) to the recording element substrate H1100. As the wiring member H1300, a printed wiring board having flexibility such as flexible wiring board is used. The wiring member H1300 having flexibility is folded to facilitate electrical connection between the recording element substrate H1100 and the recording apparatus and fixed to the ink supply unit H1500.

Examples of an ink ejection system include a system of supplying an ink with dynamic energy and a system of supplying an ink with thermal energy. In the invention, a line head that ejects an ink by either of these systems is preferred.

The ink jet recording apparatus may be equipped with a unit for controlling the temperature of the ink in the line head. The temperature of an ink in the line head can be controlled, for example, by a unit for controlling the temperature of the line head. Examples of the unit for controlling the temperature of the line head include an ink temperature regulation heater provided so as to be brought into contact with the line head and an ink ejection heater. For controlling the temperature (heating or warming) of the ink by the ink ejection heater, it is only necessary, for example, to repeat application of an electric current to such an extent that it does not cause ejection of the ink. The temperature of the ink can be read, for example, by a temperature sensor provided in the line head. The temperature of the line head and the ink is preferably adjusted to from 40 to 70° C.

(Constitution of Wiping Mechanism)

Figure 4A:
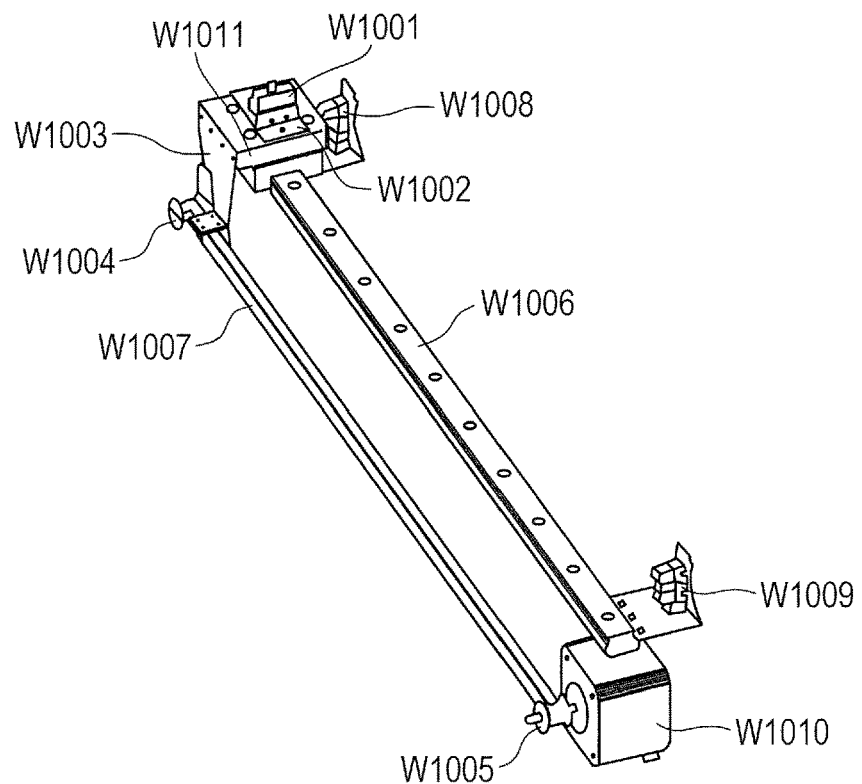
Figure 4B:
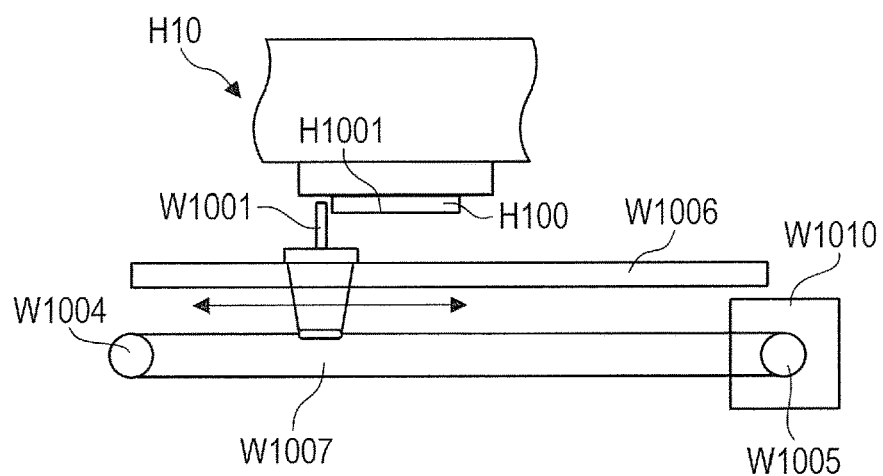

The recovery mechanism of the ink jet recording apparatus may be equipped with a wiping mechanism for recovering from sticking of an ink to the ejection orifice of the line head or wetting of the surface of the ejection orifice. FIGS. 4A and 4B show one example of the wiping mechanism, in which FIG. 4A is a perspective view and FIG. 4B is a schematic view. As shown in FIG. 4, a wiper W1001 is hold by a clip member W1002 and the clip member W1002 is hold by a linking member W1003. The clip member W1002 is attached to a wipe base W1011 capable of travelling on a slide rail W1006. The wipe base W1011 can travel on the slide rail W1006, driven by a timing belt W1007 through the linking member W1003. The timing belt W1007 is supported by a driven pulley W1004 and a driving pulley W1005. To the driving pulley W1005, the shaft of a driving motor W1010 for driving the timing belt W1007 is linked.

For controlling the position of the wiper W1001 at the time of recovery operation, the slide rail W1006 has, at both ends thereof, photo sensors W1008 and W1009. At the time of recovery operation by wiping, the wiper W1001 slides and moves by means of the slide rail W1006 and thereby, the wiper W1001 wipes the ejection orifice surface H1001 of a recording head H1000 while bending.

[Structure of Ink Flow Mechanism]

Figure 5:
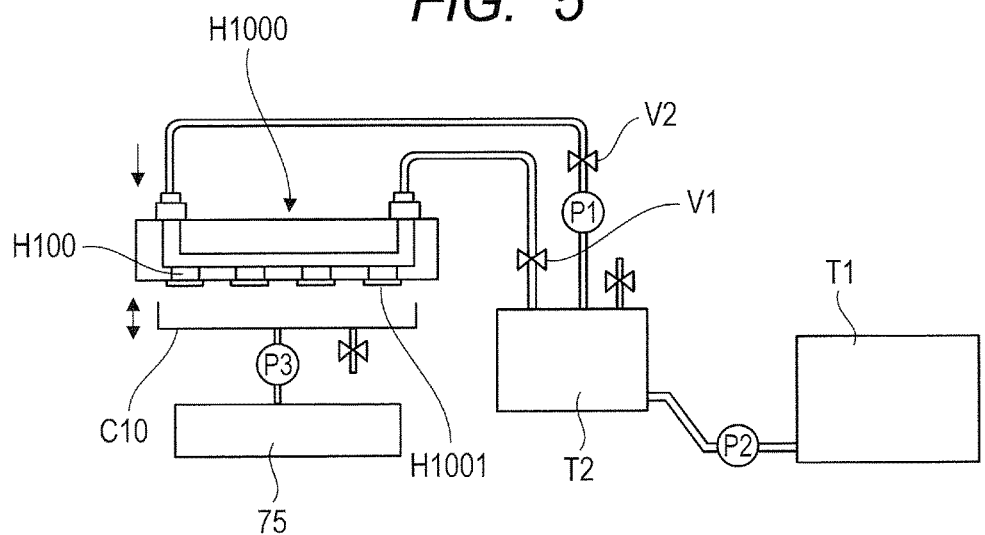
FIG. 5 is a schematic view showing one example of a mechanism for supplying a line head with an ink.

Next, a description will be made on an ink flow mechanism that is included in the recovery mechanism of the ink jet recording apparatus of the invention and causes the ink in the nozzle to flow. FIG. 5 is a schematic view showing one example of a supply mechanism for supplying an ink to the line head. As shown in FIG. 5, the ink is supplied from a sub tank T2 to the line head H1000 with a pump P1. The ink overflowing from the line head H1000 is returned to the sub tank T2. A valve V1 is provided for switching between pressurization and release of pressure in an ink chamber inside the line head at the time of recovery operation. At the time of recovery by pressurization, the valve V1 is closed and pressurization is performed with the pump P1 to remove some of bubbles from an ink supply path and an ink flow path. The liquid level of the ink in the sub tank T2 is constituted so that a water head difference with the ejection orifice surface of the line head H1000 is kept within a certain range, by which the negative pressure of the ejection orifice surface of the line head H1000 is kept within an appropriate range. When an amount of the ink in the sub tank T2 is not enough, an ink is delivered from a main tank T1 to the sub tank T2 with a pump P2. The temperature of the tanks and inks housed therein depends on the environmental temperature at which the ink jet recording apparatus is placed. For example, a temperature within a range of from 15 to 45° C. is preferred.

When the recovery mechanism for recovering the ejection state of an ink from a nozzle is comprised only of the wiping mechanism as shown in FIGS. 4A and 4B, it is difficult to achieve excellent recoverability because the ink in the nozzle of a line head cannot be caused to flow. On the other hand, the recovery mechanism of the ink jet recording apparatus of the invention includes an ink flow mechanism for causing the ink in the nozzle to flow. This ink flow mechanism is capable of pressurizing or sucking the ink in the nozzle to cause it to flow. Further, the ink jet recording apparatus of the invention is equipped with a unit for reducing the viscosity of the ink in the nozzle at the time of operating the ink flow mechanism. Using an ink jet recording apparatus equipped with such a recovery mechanism including an ink flow mechanism makes it possible to achieve excellent recoverability even if an ink capable of recording an image excellent in optical density and likely to thicken or firmly adhere to the nozzle is used.

[Control Constitution]

Figure 6:
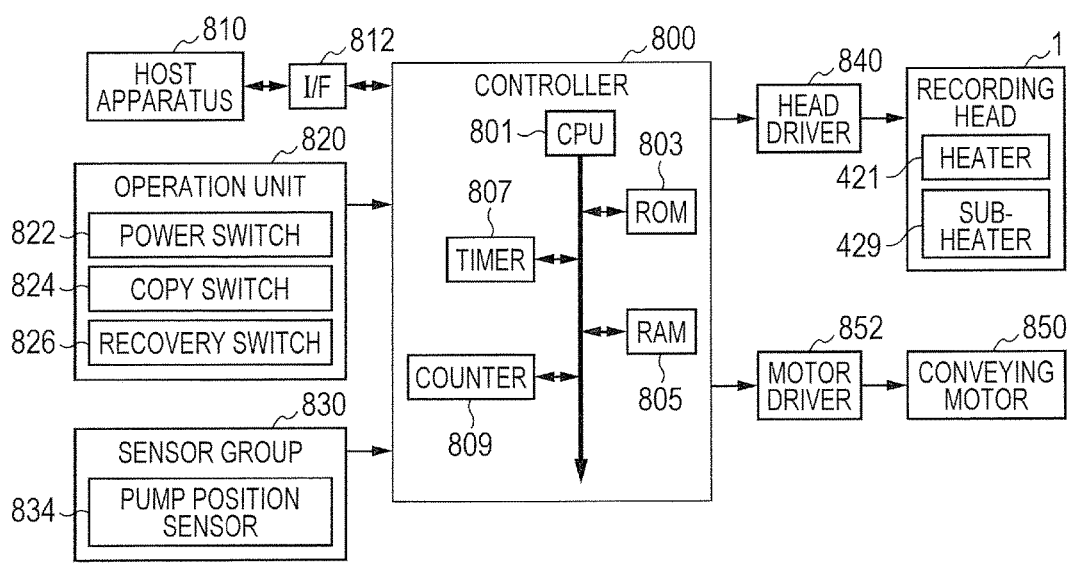
FIG. 6 is a block diagram showing one example of the control constitution of an ink jet recording apparatus.

FIG. 6 is a block diagram showing one example of the control constitution of the ink jet recording apparatus shown in FIG. 2. A controller 800 is a main controller unit and performs the procedure shown in FIGS. 7 to 9. The controller 800 has, for example, CPU801 in the form of a microcomputer, ROM803 having therein a program corresponding to the procedure and another fixed data, and RAM805 provided with a region for expanding image data or a working region. Further, the controller 800 has a timer 807 and a counter 809 to be used for performing the recovery operation under predetermined conditions. A host apparatus 810 is a supply source of image data and it may be either a computer in which formation, treatment, and the like of image data relating recording are performed or a reader portion for reading an image. The image data, another command, status signals, and the like are transferred between the host apparatus and the controller 800 via an interface (I/F) 812.

An operation unit 820 is comprised of switches for accepting an instruction input by an operator such as a power supply switch 822, a copy switch 824 for instructing start of recording or copying, and a recovery switch 826 for instructing to perform the recovery operation. A sensor group 830 is comprised of a sensor group for detecting the state of the recording apparatus such as a pump position sensor 834 for detecting the position of a suction pump P3 (FIG. 5). A head driver 840 drives an ink ejection heater 421 and an ink temperature adjusting heater (sub-heater 429). A conveying motor 850 is a motor for conveying a recording medium 6 and it is driven by a motor driver 852.

Next, a specific operation method of the ink flow mechanism will be described referring to FIG. 5. In order to cause the ink in the nozzle to flow by pressurization, pressurization is performed with the pump P1 while closing the valve V1 and opening the valve V2. By this pressurization, a thickened ink is ejected from the nozzle H100 of the line head H1000. On the other hand, in order to cause the ink in the nozzle to flow by suction, suction is performed with the pump P3 while bringing a cap C10 into contact with the ejection orifice surface H1001 while closing the valve V1 and opening the valve V2. By this suction, a thickened ink (waste ink 75) is ejected from the nozzle H100 of the line head H1000.

Alternatively, the cap C10 is brought into contact with the ejection orifice surface H1001 while closing both the valve V1 and the valve V2. By the suction with the pump P3, the pressure of the nozzle H100 (in the ink flow path of the line head) is then reduced. When the valve V2 is opened under such a state, the ink in the sub tank T2 enters at once in the flow path of the head and a thickened ink is ejected from the nozzle H100.

The ink flow mechanism having a mechanism of causing an ink in the nozzle to flow by suction is preferred for achieving further improved recoverability. A plurality of recording element substrates constituting the line head may be collectively capped and sucked or suction of each recording element substrate may be performed after capping each chip individually. Suction may be performed by causing each nozzle to sweep the tip of a tube linked with the pump P3 as shown in FIG. 5. The suction pressure or suction time is set as needed depending on the number of nozzles or the viscosity of the ink.

The ink jet recording apparatus is equipped with a unit for reducing the viscosity of an ink in the nozzle at the time of operating the ink flow mechanism. The unit (method) for reducing the viscosity of an ink in the nozzle can be provided according to an ejection mechanism of the line head. For example, the line head having an ejection mechanism making use of dynamic energy is usually equipped with a nozzle substrate having a plurality of nozzles, a pressure generating element made of a piezoelectric material and an electro conductive material arranged opposite to the nozzle, and an ink that fills the periphery of this pressure generating element. By applying a voltage to displace the pressure generating element, an ink can be ejected from the nozzle. In order to reduce the viscosity of an ink in the nozzle of the ink jet recording apparatus equipped with a line head having such an ejection mechanism, first, the pressure generating element is displaced to such an extent that it does not cause ejection of the ink from the nozzle and the thickened ink in the nozzle is oscillated. The viscosity of an ink in the nozzle can be reduced by mixing the thickened ink with a relatively low-viscosity ink upstream of the ink flow path by this oscillation and stirring the ink mixture.

Next a description will be made on the method of reducing the viscosity of an ink in the nozzle of an ink jet recording apparatus equipped with a thermal ink jet system line head having an electrothermal converter (recording element) that generates thermal energy for causing film boiling of the ink. First, thermal energy is applied to the ink jet recording apparatus equipped with a thermal ink jet system line head to such an extent that it does not cause ejection of the ink from the nozzle and the thickened ink in the nozzle is oscillated. Then, the viscosity of the ink in the nozzle can be reduced by applying thermal energy further to raise the temperature. The amount of energy for oscillating the ink is usually greater than the amount of energy for raising the temperature of the ink.

Needless to say, the viscosity of the ink may be reduced by providing a line head having an ejection mechanism making use of dynamic energy with an ink heating unit such as external heater and heating the ink. The viscosity of the ink may also be reduced by providing a line head having an ejection mechanism making use of thermal energy with an ink oscillation unit in addition to a heater and stirring the ink by oscillation. In the invention, it is preferred to supply thermal energy at the time of operating the ink flow mechanism to heat the ink in the nozzle and thereby reduce the viscosity of the ink. Examples of a unit for generating and supplying thermal energy to the ink include electrothermal converters such as temperature adjusting heater arranged so as to bring it into contact with the recording head and an ink ejection heater. Heating timing of the ink in the nozzle will be described later.

(Recording Method)

Figure 7:
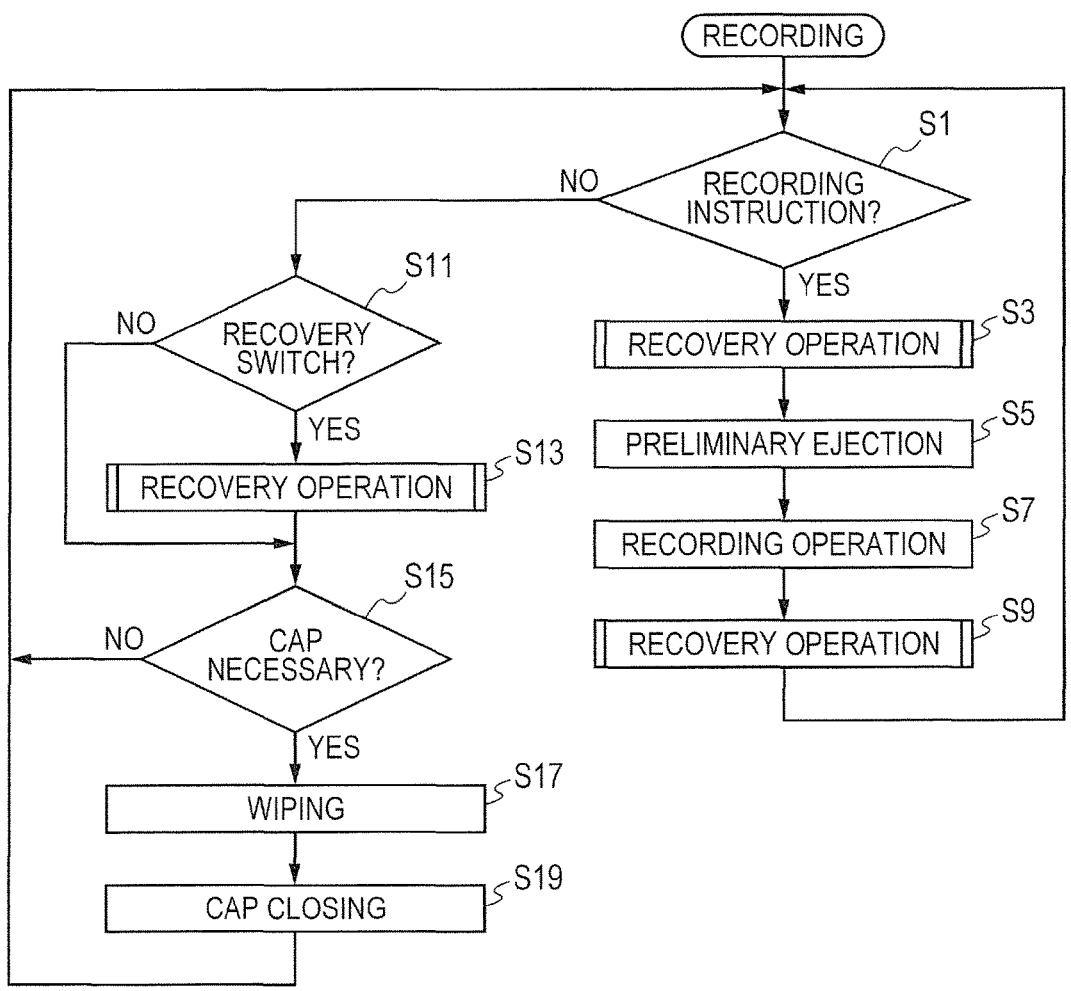
FIG. 7 is a schematic view showing one example of a recording procedure.

A specific example of a recording procedure of the ink jet recording method of the invention will next be described. FIG. 7 is a schematic view showing one example of the recording procedure. When a recording instruction is detected in Step S1, a recovery operation is performed in Step S3 if necessary. When the recovery operation is determined to be unnecessary, preliminary ejection is performed in Step S5. This preliminary ejection is a step of ejecting the thickened ink or foreign matters present in the vicinity of the ejection orifice and before recording operation, the ink is ejected from each ejection orifice. The ink ejection as preliminary ejection is performed based on preliminary ejection data irrespective of the recording data. Just after the preliminary ejection in Step S5, the recording operation is performed in Step S7. After completion of the recording operation, a recovery operation may be performed in Step S9 if necessary.

Figure 8:
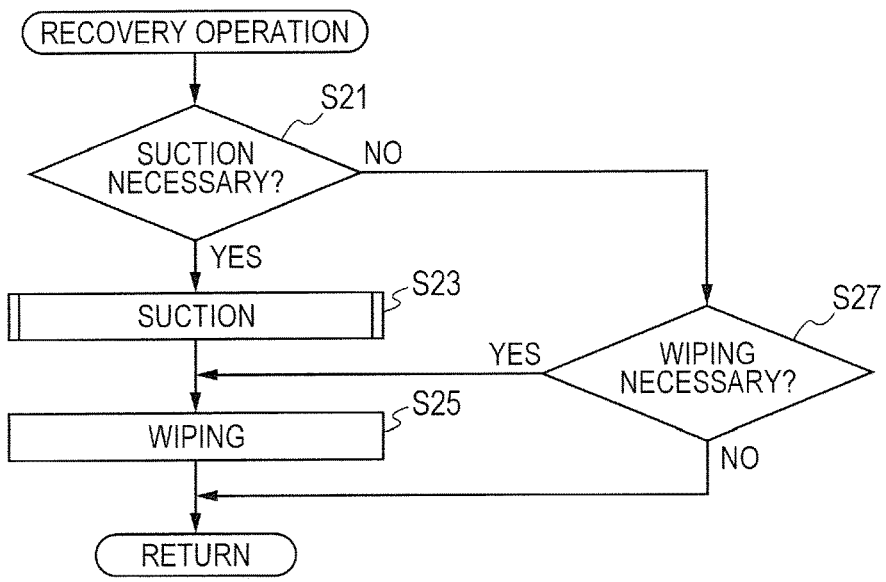
FIG. 8 is a schematic view of a part of one example of a recovery operation procedure.

Next, the above recovery operation in Step S3 and Step S9 will be described. FIG. 8 is a schematic view of a part of one example of a recovery operation procedure. Here, the recovery operation is described with the case where an ink in the nozzle is caused to flow by suction as an example. First, in Step S21 and Step S27, necessity of suction or wiping of an ejection orifice surface is determined. Suction in Step S21 is performed in the following case. When long time have passed without suction, the ink in the nozzle thickens and at the same time, bubbles are generated in the ink. This sometimes deteriorates the ejection property of the ink. In order to prevent such deterioration in the ejection property of the ink, the ink in the nozzle is sucked under predetermined conditions. For example, an elapsed time from the final suction operation is measured using a timer or the like provided in the recording apparatus and the recording apparatus is controlled to perform suction when this elapsed time becomes a threshold value or more.

When recording is performed for long time without suction, bubbles gradually attach to the inside of the nozzle or the vicinity of the ejection orifice, which may deteriorate the ejection property of the ink. In order to prevent such deterioration in the ejection property of the ink, the ink in the nozzle is suctioned under predetermined conditions. For example, the recoding apparatus is controlled to start suction when the cumulative number of ejection measured from the final suction operation time by using a counter (counter for suction) provided in the recording apparatus increases to the threshold value or more.

The wiping in Step S27 is performed in the following case. Recording for long time without wiping may deteriorate the ejection property of the ink because a large amount of ink droplets adheres to the vicinity of the ejection orifice. In order to suppress such deterioration in the ejection property of the ink, wiping is performed under predetermined conditions. For example, the cumulative ejection number from the final wiping operation time is measured using a counter (counter for wiping) or the like provided in the recording apparatus and the apparatus is controlled so as to perform wiping when the cumulative number of ejection becomes a threshold value or more. If it is determined in Step S21 that suction is necessary, suction is performed in Step S23. After completion of suction or when necessity of wiping is determined in Step S27, wiping is performed in Step S25.

Figure 9:
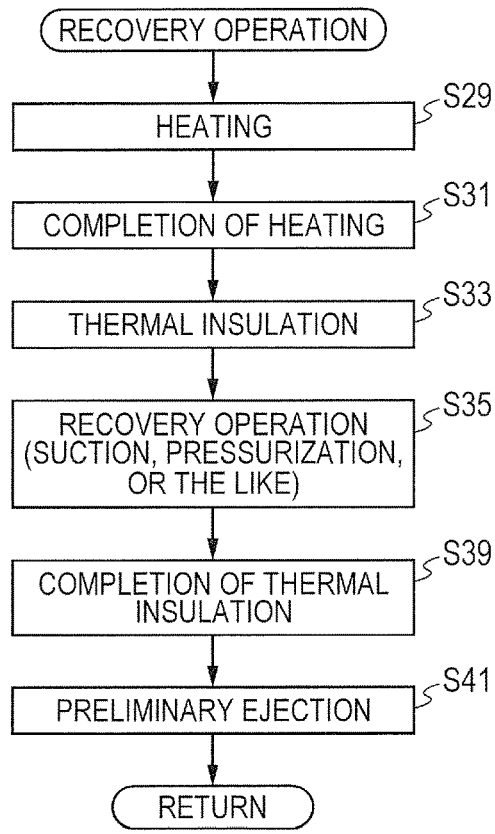
FIG. 9 is a schematic view of a part of one example of a recovery operation procedure.

FIG. 9 is a schematic view showing a part of one example of a recovery operation procedure. First, prior to the recovery operation, the viscosity of the thickened ink in the nozzle is reduced in Step S29. Here, an example of reducing the viscosity of the ink in the nozzle by heating of the ink is described. The advantageous effect (recoverability) of the invention can be obtained sufficiently even when the recovery operation (actuation of the ink flow mechanism) is performed while continuing heating. An excessive increase in the temperature of the ink in the nozzle is however presumed to deteriorate the recoverability because a liquid component in the ink is likely to evaporate from the ejection orifice and the ink firmly adheres to the vicinity of the ejection orifice. It is therefore preferred to finish the heating at an appropriate temperature in Step S31 and perform thermal insulation for keeping the ink in the nozzle at the appropriate temperature in Step S33.

Examples of a thermal insulation unit of the ink in the nozzle include electrothermal converters such as a heater for temperature adjustment arranged so as to be brought into contact with the recording head and a heater for ink ejection. When the electrothermal converter is used to keep the temperature of the ink in the nozzle, the electrothermal converter is preferably driven to such an extent that the ink is not ejected from the ejection orifice. The heating temperature and thermal insulation temperature of the ink in the nozzle may be set higher than an environmental temperature (25° C.). It is preferably 30° C. or more to 70° C. or less, more preferably 40° C. or more to 60° C. or less, particularly preferably 45° C. or more to 55° C. or less.

Both the heating in Step S29 and thermal insulation in Step S33 shown in FIG. 9 are included in the heating operation of the ink in the nozzle. The recovery operation that causes the ink in the nozzle to flow by suction or the like is performed in Step S35 while keeping the thermal insulation of the ink in the nozzle. After completion of the recovery operation in Step S35, the thermal insulation is finished in Step S39 and preliminary ejection is performed in Step S41. The preliminary ejection in Step S41 is performed to eject a mixture of the ink present in the vicinity of the ejection orifice in order to suppress color mixing which may occur when an adjacent ink having a different color is mixed during the recovery operation in Step S35.

Also when an unexpected incident such as failure in normal ejection of the ink occurs and as shown in FIG. 7, necessity of a recovery switch is determined in Step S11 by an operator, the recovery operation is performed in Step S13. When the recording operation or recovery operation is not performed over long time, capping of the ejection orifice surface with a cap provided in the recording apparatus is preferred in Step S15. This makes it possible to suppress sticking of the ink or adhesion of a foreign matter to the inside of the nozzle or the vicinity of the ejection orifice. When the ejection orifice surface is capped with the cap, it is preferred to remove ink droplets and the like attached to the vicinity of the ejection orifice by wiping in Step S17 in advance of the cap closing in Step S19.

In the invention, it is important that the ink in the nozzle has a reduced viscosity at the time of operating the ink flow mechanism. This will be described with reduction in the viscosity of an ink by heating as an example. The ink flow mechanism should be operated while continuing heating or thermal insulation. On the contrary, even heating or thermal insulation is conducted, if the ink flow mechanism is operated after the heating or thermal insulation is stopped, improvement in the recoverability be expected. This is because for example when the ink has a markedly high viscosity as a result of the aggregation of the pigment, the viscosity increases drastically as soon as the heating or thermal insulation is stopped and the recovery cannot be achieved even by operating the ink flow mechanism.

As a recording medium on which an image is to be recorded by the ink jet recording method of the invention, any media may be used. Among them, paper having permeability is preferred. Examples include recording media without a coating layer such as plain paper and non-coated paper and recording media having a coating layer such as glossy paper and art paper.

(Ink)

Components constituting an ink to be used in the ink jet recording method of the invention and physical properties of the ink will hereinafter be described in detail. The ink to be used in the invention is not necessarily a so-called "curable ink". The ink to be used in the invention therefore does not necessarily contain a compound such as polymerizable monomer which can be polymerized by application of external energy.

The dynamic surface tension of the ink to be used in the ink jet recording method of the invention at a lifetime of 10 milliseconds is 55 mN/m or less, preferably 47 mN/m or less. The dynamic surface tension within the above-described range at a lifetime of 10 milliseconds enables an image to have a good fixability even by high-speed recording using an ink jet recording apparatus equipped with a line head. The dynamic surface tension of an ink at a lifetime of 10 milliseconds is preferably 30 mN/m or more. When the ink has a dynamic surface tension less than 30 mN/m at a lifetime of 10 milliseconds, an image excellent in optical density cannot always be recorded while the fixability of the image is good. The dynamic surface tension of the ink can be adjusted, for example, by setting the content of a surfactant which will be described later as needed.

The dynamic surface tension of the ink can be measured using a maximum bubble pressure method. Specifically, the maximum bubble pressure method is a method of measuring the maximum pressure required to release a bubble formed at a tip portion of a probe (capillary) dipped in a liquid to be measured and then determining the surface tension of the liquid from the maximum pressure thus measured. The lifetime means, upon forming a bubble at the tip portion of the probe in the maximum bubble pressure method, the period between the time when a surface of a new bubble is formed after a bubble already formed is released from the tip portion and the time when the bubble pressure reaches the maximum value (when the curvature radius of the bubble becomes equal to the radius of the tip portion of the probe). The dynamic surface tension of the ink in the invention is a value measured at 25° C.

[Pigment]

The ink to be used in the ink jet recording method of the invention contains a pigment. Examples of the pigment include inorganic pigments and organic pigments. As the pigment, usable are resin-dispersed type pigments using a resin as a dispersant and self-dispersible type pigments (self-dispersible pigments) having a hydrophilic group introduced into the surface of pigment particles. Pigments different in dispersion method can be used in combination. In the ink jet recording method of the invention, using a dispersion system not making use of a resin dispersant is preferred, with using a self-dispersible pigment being more preferred.

Examples of the resin-dispersed type pigments include resin-dispersed pigments using a polymer dispersant, microcapsule type pigments obtained by covering the surface of pigment particles with a resin, and resin-bound type pigments obtained by chemically binding a polymer-containing organic group to the surface of pigment particles. As the resin, acrylic resins having at least an anionic-group-having unit such as (meth)acrylic acid and an anionic-group-free unit such as a monomer having an aromatic ring or aliphatic group are preferred.

Examples of the self-dispersible type pigments include those obtained by binding an anionic group to the surface of pigment particles directly or via another atomic group. Examples of the anionic group include carboxylic acid group, sulfonic acid group, phosphoric acid group, and phosphonic acid group. Examples of the counter ion of the anionic group include cations such as hydrogen atom, alkali metals, ammonium, and organic ammoniums. The "another atomic group" has a function of a spacer between the surface of pigment particles and the ionic group and has preferably a molecular weight of 1000 or less. Examples of the another atomic group include alkylene groups having from about 1 to 6 carbon atoms, arylene groups such as phenylene and naphthylene, ester groups, imino groups, amide groups, sulfonyl groups, and ether groups. The another atomic group may be a combination of these groups.

The pigment has an average particle diameter of 80 nm or more. An image recorded using the pigment having an average particle diameter less than 80 nm has an inadequate optical density. The pigment has preferably an average particle diameter of 100 nm or more. An image recorded using the pigment having an average particle diameter of 100 nm or more has a higher optical density. Further, the pigment has preferably an average particle diameter of 1000 nm or less. Since the pigment having an average particle diameter more than 1000 nm shows marked sedimentation, the recoverability may be low even after treatment for reducing the viscosity of the ink in the nozzle. The pigment has preferably an average particle diameter of 200 nm or less, more preferably 150 nm or less.

The term "average particle diameter" as used herein means a value determined using a dynamic light scattering system particle size distribution analyzer. In Examples described later, by using "Nanotrac UPA150EX" (trade name; product of NIKKISO) as the dynamic light scattering system particle size distribution analyzer, $D_{50}$ is measured. The 50% cumulative value $D_{50}$ (nm) of the particle diameter distribution of the pigment is an average of the particle diameter based on volume (volume average particle diameter).

The content (% by mass) of the pigment in the ink is preferably 0.10% by mass or more to 15.00% by mass or less, more preferably 1.00% by mass or more to 10.00% by mass or less, each based on the total mass of the ink. Of these, 2.00% by mass or more to 10.00% by mass or less is particularly preferred. The content of the pigment less than 2.00% by mass may reduce the optical density of an image to be recorded. The content of the pigment more than 10.00% by mass, on the other hand, may deteriorate the recoverability.

[Water-Soluble Organic Solvent]

The ink contains at least water as an aqueous medium. The water used is preferably deionized water (ion-exchanged water). The ink has preferably a water content (% by mass) of 50.00% by mass or more to 95.00% by mass or less, more preferably 60.00% by mass or more to 95.00% by mass or less, each based on the total mass of the ink.

The ink may also contain a water-soluble organic solvent as the aqueous medium. As the water-soluble organic solvent, any of those ordinarily used for inks to be used in an ink jet recoding method can be used. Specific examples of the water-soluble organic solvent include alkyl alcohols having from 1 to 4 carbon atoms, amides, ketones or ketoalcohols, ethers, polyalkylene glycols, glycols, alkylene glycols having an alkylene group with from 2 to 6 carbon atoms, alkyl ether acetates, alkyl ethers of a polyhydric alcohol, and nitrogenous compounds. These water-soluble organic solvents may be used either singly or in combination. The content (% by mass) of the water-soluble organic solvent in the ink is preferably 3.00% by mass or more to 50.00% by mass or less, more preferably 5.00% by mass or more to 30.00% by mass or less, each based on the total mass of the ink.

The water-soluble organic solvent has preferably a surface tension at 25° C. of 40 mN/m or less. Using the water-soluble organic solvent having a surface tension at 25° C. of 40 mN/m or less enhances the permeation of the ink into a recording medium and improves a fixability of an image. The content of the water-soluble organic solvent having a surface tension of 40 mN/m or less is preferably adjusted as needed so that the resulting ink has a dynamic surface tension of 55 mN/m or less at a lifetime of 10 milliseconds. Specifically, the content (% by mass) of the water-soluble organic solvent having a surface tension of 40 mN/m or less in the ink is preferably 0.10% by mass or more to 10.00% by mass or less based on the total mass of the ink.

Specific examples of the water-soluble organic solvent having a surface tension at 25° C. of 40 mN/m or less (the value in the parentheses is surface tension (unit: mN/m)) include primary alcohols such as ethanol (21.3) and isopropanol (21.0); glycols such as 1,2-propanedioil (35.9), 2-methyl-1,3-propanediol (39.1), 3-methyl-1,5-pentanediol (38.1), and 1,2-hexanediol (27.6); and glycol ethers such as ethylene glycol monoethyl ether (28.2), diethylene glycol mono-n-butyl ether (29.4), and triethylene glycol mon-n-butyl ether (31.1). Of these, glycol ethers and 1,2-alkane diols are preferred. These water-soluble organic solvents may be used either singly or in combination.

[Surfactant]

The ink may contain a surfactant. The content (% by mass) of the surfactant in the ink is preferably 0.01% by mass or more to 5.00% by mass or less, more preferably 0.25% by mass or more to 3.00% by mass or less, each based on the total mass of the ink. Although the kind of the surfactant is not particularly limited, preferred are surfactants capable of adjusting the dynamic surface tension of the ink at a lifetime of 10 milliseconds to 55 mN/m or less when used in combination with another component such as the water-soluble organic solvent as needed. Specific examples of the surfactant include hydrocarbon-based surfactants such as ethylene oxide adducts of acetylene glycol, polyethylene glycol alkyl ethers, and polyoxyethylene polyoxypropylene block copolymers, fluorine-based surfactants such as perfluoroalkyl ethylene oxide adducts, and silicone-based surfactants such as polyether-modified siloxane compounds. Of these, the hydrocarbon-based surfactants are preferred. These surfactants may be used either singly or in combination. Of these, acetylene glycol-based surfactants are preferred. The dynamic surface tension of the ink at lifetime of 10 milliseconds can be adjusted easily to fall within a desired range by incorporating an adequate amount of an acetylene glycol-based surfactant in an ink.

[Other Components]

The ink may contain, in addition to the above-described components, a water-soluble organic compound which is in solid form at normal temperature such as urea, a urea derivative, trimethylolpropane, or trimethylolethane. It may also contain various additives such as resin, pH regulator, rust preventive, antiseptic, antifungal agent, antioxidant, or reduction preventive in order to obtain an ink having desired physical property values if necessary. When a resin is incorporated in the ink for various purposes such as a dispersant, it preferably does not have an excessively high acid value. Described specifically, the acid value is preferably 190 mgKOH/g or less, more preferably 150 mgKOH/g or less.

[Physical Properties of Ink]

The ink has preferably a viscosity at 25° C. of 1.0 mPa·s or more to 5.0 mPa·s or less, more preferably 1.0 mPa·s or more to 3.0 mPa·s or less. The ink has preferably a surface tension at 25° C. of 28 mN/m or more to 45 mN/m or less. The ink has preferably a pH at 25° C. of 5 or more to 9 or less.

[Examples]

The invention will hereinafter be described in further detail by Examples and Comparative Examples. The invention is not restricted to or by the following Examples insofar as it does not depart from the gist of the invention. All designations of "part or parts" and "%" are on a mass basis unless otherwise specifically indicated.

<Preparation of Pigment Dispersion Liquid>

(Pigment Dispersion Liquid 1)

A solution obtained by dissolving 5 g of concentrated hydrochloric acid in 5.5 g of water was cooled to 5° C. and 1.5 g of 4-amino-1,2-benzenedicarboxylic acid was added. An aqueous sodium nitrite solution obtained by dissolving 1.8 g of sodium nitrite in 9 g of water of 5° C. was added while keeping the temperature of the solution at 10° C. or less. After stirring for 15 minutes, 6 g of carbon black (average particle diameter: 100 nm) having a specific surface area of 220 $m^2$/g and DBP oil absorption of 105 mL/100 g was added under stirring. A slurry obtained by stirring for further 15 minutes was filtered through a filter paper ("Standard Filter Paper No. 2", trade name; product of Advantec). The filtrate was washed sufficiently with water and then cried in an oven of 110° C. to obtain self-dispersible carbon black. Water was added to the self-dispersible carbon black thus obtained to give its self-dispersible carbon black (pigment) content of 10.0%. As a result, a pigment dispersion liquid was obtained as a water dispersion of the self-dispersible carbon black having a —$C_6H_3$—$(COONa)_2$ group introduced into the particle surface thereof. Then, the sodium ion was replaced with a potassium ion by ion exchange method and a water dispersion of the self-dispersible carbon black having a —$C_6H_3$—$(COOK)_2$ group bound to the particle surface thereof was obtained as pigment dispersion liquid 1. The average particle diameter of the pigment (carbon black) in pigment dispersion liquid 1 thus obtained was 100 nm.

(Pigment Dispersion Liquid 2)

By mixing 500.0 g of ion exchanged water with 15.0 g of carbon black and stirring the resulting mixture at 15,000 rpm for 30 minutes, the carbon black (pigment) was preliminary wetted. After addition of 4,485 g of deionized water, the resulting mixture was dispersed using a high-pressure homogenizer to obtain a dispersion. The pigment in the dispersion thus obtained had an average particle diameter of 100 nm. The dispersion thus obtained was moved to a high pressure vessel. After application of a pressure of 3.0 MPa, the pigment was subjected to ozone oxidation treatment by introducing ozone water having an ozone concentration of 100 ppm. After adjusting the pH to 10.0 with potassium hydrochloride, the content of the pigment was adjusted to obtain, as pigment dispersion liquid 2, a water dispersion having the self-dispersible carbon black having a —COOK group bound to the particle surface thereof. The content of the pigment in pigment dispersion liquid 2 was 30.0% and the average particle diameter of it was 100 nm.

(Pigment Dispersion Liquid 3)

A water-soluble resin (resin dispersant) was dissolved in ion-exchanged water by using sodium hydroxide in an amount to give a neutralization equivalent of 1 to prepare an aqueous solution of the resin dispersant having a content of the water-soluble resin of 20.0%. As the water-soluble resin, a styrene/acrylic acid copolymer (styrene:acrylic acid (mole ratio)=33:67, weight-average molecular weight: 10,000, acid value: 200 mgKOH/g). In a sand grinder were poured 15.0 parts of a pigment (carbon black), 30.0 parts of the aqueous solution of the resin dispersant, and 55.0 parts of water and the resulting mixture was subjected to dispersing treatment for one hour. After removal of coarse particles by centrifugal separation, the residue was filtered through Micro Filter (product of Fujifilm) having a pore size of 3.0 µm under pressure. Then, an adequate amount of ion-exchanged water was added to obtain pigment dispersion liquid 3. The content of the pigment in pigment dispersion liquid 3 was 15.0%, the content of the water-soluble resin (resin dispersant) was 6.0%, and the average particle diameter of the pigment was 100 nm.

(Pigment Dispersion Liquid 4)

In a reactor were poured 500 g of carbon black, 45 g of aminophenyl(2-sulfoethyl)sulfone, and 900 g of distilled water. The resulting mixture was stirred at 55° C. at 300 rpm for 20 minutes. The carbon black had a specific surface area of 220 m$^2$/g and DBP absorption of 112 mL/100 g. After dropwise addition of 40 g of a 25% aqueous sodium nitrite solution for 15 minutes, 50 g of distilled water was added. The resulting mixture was caused to react at 60° C. for 2 hours to obtain a reaction product. The reaction product was taken out while diluting with distilled water to adjust its solid content of 15.0%. Impurities were removed by centrifugal separation treatment and purification treatment to obtain a dispersion (1). The carbon black in the dispersion (1) had an aminophenyl(2-sulfoethyl)sulfone functional group bound to the particle surface thereof. The number of moles of the functional group bound to the particle surface of the carbon black in the dispersion (1) was determined as follows. First, the sodium ion concentration of the dispersion (1) was determined using a probe type sodium electrode. Then, it was converted into a sodium ion concentration per unit mass of the carbon black and the number of moles of the functional group bound to the carbon black was determined.

Next, a pentaethylenehexamine solution was kept at room temperature while vigorous stirring and the dispersion (1) was added dropwise thereto for one hour to obtain a mixture. Here, the pentaethylenehexamine was used in an amount from 1 to 10 mol times the amount of the sodium ion found from the sodium ion concentration determined above and the solution was used in an amount equal to that of the dispersion (1). After stirring the resulting mixture for from 18 to 48 hours, the mixture was subjected to the purification treatment and a dispersion (2) having a solid content of 10.0% was obtained. The carbon black in the dispersion (2) had pentaethylenehexamine bound to the particle surface thereof.

After mixing 190 g of a styrene-acrylic acid resin with 1,800 g of distilled water, potassium hydroxide was added in an amount necessary for neutralization of the resin. The resulting mixture was stirred to dissolve the resin in the water and an aqueous solution of the styrene-acrylic acid resin was obtained. The styrene-acrylic resin had a weight-average molecular weight of 8,000, an acid value of 140 mgKOH/g, and polydispersity Mw/Mn (Mw: weight-average molecular weight, Mn: number-average molecular weight) of 1.5. To the aqueous solution of the styrene-acrylic acid resin thus obtained was added dropwise 500 g of the dispersion (2) under stirring to obtain a mixture. The mixture thus obtained was moved to an evaporation dish, dried by heating at 150° C. for 15 hours, and then cooled to room temperature to obtain a dried product.

The dried product thus obtained was added to distilled water adjusted to pH 9.0 with potassium hydroxide. After the resulting mixture was dispersed using a disperser, a 1.0 mol/L aqueous potassium hydroxide solution was added under stirring to adjust the pH to from 10 to 11. Impurities and coarse particles were removed by desalting treatment and purification treatment to obtain, as pigment dispersion liquid 4, a water dispersion of the resin-bound type self-dispersible carbon black. Pigment dispersion liquid 4 thus obtained had a pigment content of 10.0% and pH of 10.1, and the pigment had an average particle diameter of 100 nm.

(Pigment Dispersion Liquid 5)

A commercially-available cyan pigment dispersion liquid containing a self-dispersible pigment ("CAB-O-JET450C", trade name; product of Cabot, pigment content: 15.0%, average particle diameter of pigment: 115 nm) was used as pigment dispersion liquid 5.

(Pigment Dispersion Liquid 6)

A commercially-available magenta pigment dispersion liquid containing a self-dispersible pigment ("CAB-O-JET465M", trade name; product of Cabot, pigment content: 15.0%, average particle diameter of pigment: 100 nm) was used as pigment dispersion liquid 6.

(Pigment Dispersion Liquid 7)

A commercially-available yellow pigment dispersion liquid containing a self-dispersible pigment ("CAB-O-JET470Y", trade name; product of Cabot, pigment content:

15.0%, average particle diameter of pigment: 170 nm) was used as pigment dispersion liquid 7.

(Pigment Dispersion Liquid 8)

In a manner similar to that of pigment dispersion liquid 1 except for the use of carbon black having an average particle diameter of 80 nm, pigment dispersion liquid 8 was obtained. The pigment in pigment dispersion liquid 8 thus obtained had an average particle diameter of 80 nm.

(Pigment Dispersion Liquid 9)

In a manner similar to that of pigment dispersion liquid 1 except for the use of carbon black having an average particle diameter of 99 nm, pigment dispersion liquid 9 was obtained. The pigment in pigment dispersion liquid 9 thus obtained had an average particle diameter of 99 nm.

(Pigment Dispersion Liquid 10)

In a manner similar to that of pigment dispersion liquid 1 except for the use of carbon black having an average particle diameter of 130 nm, pigment dispersion liquid 10 was obtained. The pigment in pigment dispersion liquid 10 thus obtained had an average particle diameter of 130 nm.

(Pigment Dispersion Liquid 11)

In a manner similar to that of pigment dispersion liquid 1 except for the use of carbon black having an average particle diameter of 70 nm, pigment dispersion liquid 11 was obtained. The pigment in pigment dispersion liquid 11 thus obtained had an average particle diameter of 70 nm.

<Measurement Method of Average Particle Diameter of Pigment>

A value $D_{50}$ measured using a dynamic light scattering system particle size distribution analyzer ("Nanotrac UPA150EX"; trade name; product of NIKKISO) was used as an average particle diameter of a pigment. The 50% cumulative value $D_{50}$ (nm) of the particle size distribution of the pigment corresponds to an average of the particle diameter based on volume (that is, volume average particle diameter).

<Preparation of Ink>

After the components (unit: %) listed in the upper part of Tables 1-1 to 1-3 were mixed and stirred sufficiently, the resulting mixture was filtered through Micro Filter (product of Fujifilm) having a pore size of 3.0 μm under pressure to prepare Inks 1 to 27. The numerical value attached to each of the water-soluble organic solvents in Tables 1-1 to 1-3 is surface tension (unit: mN/m) of the water-soluble organic solvents in an environment with a temperature of 25° C. and a humidity of 50%. The surface tension of the water-soluble organic solvents was measured using an automatic surface tensiometer ("CBVP-Z", trade name; product of Kyowa Interface Science).

The following are details of the components listed in Tables 1-1 to 1-3.

Acetylenol E100: acetylene glycol-based surfactant (product of Kawaken Fine Chemicals)

Acetylenol E60: acetylene glycol-based surfactant (product of Kawaken Fine Chemicals)

Nikkol BL-9 EX: polyoxyethylene alkyl ether (product of Nikko Chemicals)

The average particle diameter of the pigment in each of the inks prepared above was measured using the above-described method. In addition, the dynamic surface tension of each of the inks at a lifetime of 10 milliseconds was measured. The dynamic surface tension of the inks was measured using a dynamic surface tension measurement apparatus ("Bubble Pressure Tensiometer BP2", trade name; product of KRUSS) according to the maximum foam pressure method. The average particle diameter of the pigment and the dynamic surface tension (γ10 m) of the ink at 10 milliseconds are shown in the lower part of Tables 1-1 to 1-3.

TABLE 1-1

Composition and properties of inks 1 to 9

| | Ink | | | | | | | | |
|---|---|---|---|---|---|---|---|---|---|
| | 1 | 2 | 3 | 4 | 5 | 6 | 7 | 8 | 9 |
| Pigment dispersion liquid 1 | 40.00 | | | | | | | | |
| Pigment dispersion liquid 2 | | 13.33 | | | | | | | |
| Pigment dispersion liquid 3 | | | 26.67 | | | | | | |
| Pigment dispersion liquid 4 | | | | 40.00 | | | | | |
| Pigment dispersion liquid 5 | | | | | 26.67 | | | | |
| Pigment dispersion liquid 6 | | | | | | 26.67 | | | |
| Pigment dispersion liquid 7 | | | | | | | 26.67 | | |
| Pigment dispersion liquid 8 | | | | | | | | 40.00 | |
| Pigment dispersion liquid 9 | | | | | | | | | 40.00 |
| Pigment dispersion liquid 10 | | | | | | | | | |
| Pigment dispersion liquid 11 | | | | | | | | | |
| Glycerin (63.8) | 10.00 | 10.00 | 10.00 | 10.00 | 10.00 | 10.00 | 10.00 | 10.00 | 10.00 |
| Diethylene glycol(44.3) | 3.00 | 3.00 | 3.00 | 3.00 | 3.00 | 3.00 | 3.00 | 3.00 | 3.00 |
| N-methyl-2-pyrrolidone (40.4) | | | | | | | | | |
| 2-methyl-1,3-propanediol (39.1) | | | | | | | | | |
| Triethylene glycol monobutyl ether (31.1) | | | | | | | | | |
| 1,2-hexanediol (27.6) | 2.00 | 2.00 | 2.00 | 2.00 | 2.00 | 2.00 | 2.00 | 2.00 | 2.00 |
| Acetylenol E100 | 0.60 | 0.55 | 0.45 | 0.60 | 0.50 | 0.50 | 0.50 | 0.60 | 0.60 |
| Acetylenol E60 | | | | | | | | | |
| NIKKOL BL-9EX | | | | | | | | | |
| Ion-exchanged water | 44.40 | 71.12 | 57.88 | 44.40 | 57.83 | 57.83 | 57.83 | 44.40 | 44.40 |
| Content of pigment (%) | 4.00 | 4.00 | 4.00 | 4.00 | 4.00 | 4.00 | 4.00 | 4.00 | 4.00 |
| Average particle diameter of pigment (nm) | 100 | 100 | 100 | 100 | 115 | 100 | 170 | 80 | 99 |
| γ10m (mN/m) | 40 | 40 | 40 | 40 | 40 | 40 | 40 | 40 | 40 |

TABLE 1-2

Composition and properties of inks 10 to 18

| | Ink | | | | | | | | |
|---|---|---|---|---|---|---|---|---|---|
| | 10 | 11 | 12 | 13 | 14 | 15 | 16 | 17 | 18 |
| Pigment dispersion liquid 1 | | 40.00 | 40.00 | 40.00 | 40.00 | 19.00 | 20.00 | | |
| Pigment dispersion liquid 2 | | | | | | | | 33.33 | 33.67 |
| Pigment dispersion liquid 3 | | | | | | | | | |
| Pigment dispersion liquid 4 | | | | | | | | | |
| Pigment dispersion liquid 5 | | | | | | | | | |
| Pigment dispersion liquid 6 | | | | | | | | | |
| Pigment dispersion liquid 7 | | | | | | | | | |
| Pigment dispersion liquid 8 | | | | | | | | | |
| Pigment dispersion liquid 9 | | | | | | | | | |
| Pigment dispersion liquid 10 | 40.00 | | | | | | | | |
| Pigment dispersion liquid 11 | | | | | | | | | |
| Glycerin (63.8) | 10.00 | 10.00 | 10.00 | 10.00 | 10.00 | 10.00 | 10.00 | 10.00 | 10.00 |
| Diethylene glycol(44.3) | 3.00 | 3.00 | 3.00 | 3.00 | 3.00 | 3.00 | 3.00 | 3.00 | 3.00 |
| N-methyl-2-pyrrolidone (40.4) | | | | | | | | | |
| 2-methyl-1,3-propanediol (39.1) | | | | | | | | | |
| Triethylene glycol monobutyl ether (31.1) | | | | | | | | | |
| 1,2-hexanediol (27.6) | 2.00 | 5.00 | 1.75 | 1.75 | 0.05 | 2.00 | 2.00 | 2.00 | 2.00 |
| Acetylenol E100 | 0.60 | 1.00 | 0.05 | 0.03 | 0.05 | 0.60 | 0.60 | 0.55 | 0.55 |
| Acetylenol E60 | | 3.00 | | | | | | | |
| NIKKOL BL-9EX | | | | | | | | | |
| Ion-exchanged water | 44.40 | 38.00 | 45.20 | 45.22 | 46.90 | 65.40 | 64.40 | 51.12 | 50.78 |
| Content of pigment (%) | 4.00 | 4.00 | 4.00 | 4.00 | 4.00 | 1.90 | 2.00 | 10.00 | 10.10 |
| Average particle diameter of pigment (nm) | 130 | 100 | 100 | 100 | 100 | 100 | 100 | 100 | 100 |
| γ10m (mN/m) | 40 | 30 | 47 | 48 | 55 | 40 | 40 | 40 | 40 |

TABLE 1-3

Composition and properties of inks 19 to 27

| | Ink | | | | | | | | |
|---|---|---|---|---|---|---|---|---|---|
| | 19 | 20 | 21 | 22 | 23 | 24 | 25 | 26 | 27 |
| Pigment dispersion liquid 1 | 40.00 | 40.00 | 40.00 | 40.00 | 40.00 | 40.00 | 40.00 | | 40.00 |
| Pigment dispersion liquid 2 | | | | | | | | | |
| Pigment dispersion liquid 3 | | | | | | | | | |
| Pigment dispersion liquid 4 | | | | | | | | | |
| Pigment dispersion liquid 5 | | | | | | | | | |
| Pigment dispersion liquid 6 | | | | | | | | | |
| Pigment dispersion liquid 7 | | | | | | | | | |
| Pigment dispersion liquid 8 | | | | | | | | | |
| Pigment dispersion liquid 9 | | | | | | | | | |
| Pigment dispersion liquid 10 | | | | | | | | 40.00 | |
| Pigment dispersion liquid 11 | | | | | | | | | |
| Glycerin (63.8) | 10.00 | 10.00 | 10.00 | 10.00 | 10.00 | 10.00 | 10.00 | 10.00 | 10.00 |
| Diethylene glycol(44.3) | 3.00 | 3.00 | 3.00 | 3.00 | 3.00 | 3.00 | 3.00 | 3.00 | 3.00 |
| N-methyl-2-pyrrolidone (40.4) | | | | 12.00 | | | | | |
| 2-methyl-1,3-propanediol (39.1) | | | | | 6.00 | | | | |
| Triethylene glycol monobutyl ether (31.1) | | | | | | 2.50 | 1.20 | | |
| 1,2-hexanediol (27.6) | 2.00 | 2.00 | 1.00 | | | | 1.00 | 2.00 | 0.05 |
| Acetylenol E100 | | | | 0.60 | 0.60 | 0.60 | 0.60 | 0.60 | 0.03 |
| Acetylenol E60 | 0.10 | | | | | | | | |
| NIKKOL BL-9EX | | | 0.10 | | | | | | |
| Ion-exchanged water | 44.90 | 45.00 | 45.90 | 34.40 | 40.40 | 43.90 | 44.20 | 44.40 | 46.92 |
| Content of pigment (%) | 4.00 | 4.00 | 4.00 | 4.00 | 4.00 | 4.00 | 4.00 | 4.00 | 4.00 |
| Average particle diameter of pigment (nm) | 100 | 100 | 100 | 100 | 100 | 100 | 100 | 70 | 100 |
| γ10m (mN/m) | 40 | 47 | 47 | 40 | 40 | 40 | 40 | 40 | 56 |

<Evaluation>

An ink jet recording apparatus having the constitution shown in FIG. 2 and further having the wiping mechanism shown in FIGS. 4A and 4B and the supply mechanism shown in FIG. 5 was prepared. In the present examples, 1/600×1/600 inch is defined as one pixel and a recording duty of an image to which 18 ng/pixel of an ink is applied is defined 100%. The results are shown in Table 2. Inks are evaluated based on the following criteria. Those having an acceptable level are evaluated as "AA", "A", or "B", while those having an unacceptable level are evaluated as "C".

(Optical Density)

Recorded products were prepared by using the above-described ink jet recording apparatus and recording a 2 cm×2 cm solid image (recording duty: 100%) with each of the inks prepared above on the respective sheets of the following three recording media (plain paper).

"PB PAPER" (trade name; product of CANON)

"BUSINESS MULTIPURPOSE 4200 PAPER" (trade name; product of Xerox)

"Bright White Ink Jet Paper" (trade name; product of Hewlett Packard)

At the time of recording, recovery operation was performed by the method shown below. Described specifically, prior to image recording, the valve V1 was closed and the valve V2 was opened, each valve shown in FIG. 5, and suction with the pump P3 was performed while capping the ejection orifice face H1001. At the time of suction, according to the procedure shown in FIG. 9, the ink in the nozzle was heated by an ink ejection heater to such an extent that it did not cause ejection of the ink, immediately before the recovery operation was started. Then, the recovery operation was performed while thermally insulating the ink in the nozzle by a sub-heater provided in the recording head. Immediately after completion of the recovery operation, the thermal insulation of the ink in the nozzle was finished. After a series of those operations, an image (nozzle check pattern) was recorded to confirm that there was a non-ejection nozzle. Then, the above-described solid image was recorded and a recorded product was obtained.

After the resulting recorded product was left alone for one day, the optical density of the solid image was measured. The optical density of the solid image recorded using an ink having carbon black as the pigment was measured using a reflection densitometer ("Macbeth RD-918", trade name; product of Gretag Macbeth). The optical density of the solid image recorded using an ink having an organic pigment as the pigment was measured using a spectrophotometer ("Spectrolino", trade name; product of Gretag Macbeth) under the following conditions: D50 light source and 2° viewing angle. From the value of the optical density thus determined, the optical density was evaluated based on the following evaluation criteria. The optical density of the ink having an organic pigment as the pigment was evaluated based on the numerical value in the parentheses.

A: Average optical density of the three sheets was 1.1 or more (0.8 or more).

B: Average optical density of the three sheets was 0.9 or more to less than 1.1 (0.7 or more to less than 0.8).

C: Average optical density of the three sheets was less than 0.9 (less than 0.7).

(Fixability)

A recorded product was prepared by using the above-described ink jet recording apparatus and recording a 15 cm×15 cm solid image (recording duty: 100%) on two continuously fed sheets of each of the following three recording media (PPC paper) with the inks prepared above. In recording, the two sheets were delivered so that the second recorded product was stacked on the first recorded product.

"Hammermill Tidal MP" (trade name; product of International Paper)

"STEINBEIS Classic White" (trade name; product of Steinbeis)

"Bright White Ink Jet Paper" (trade name; product of Hewlett Packard)

In recording, the recovery operation was performed under conditions similar to those used in the above-described evaluation of "optical density". The recorded products were checked visually and the fixability of the image was evaluated based on the following evaluation criteria.

AA: The back side of the second sheet was not blotted.

A: The back side of the second sheet of one of the three recording media was blotted.

B: The back side of the second sheet of two of the three recording media was blotted.

C: The back side of the second sheet of three of the three recording media was blotted.

(Recoverability)

After preparation of the inks, they were left alone at normal temperature. Then, a nozzle of a line head was filled with an evaluation ink obtained by evaporating 20% by mass of each of the inks. By the resulting ink jet recording apparatus, a pattern obtained by drawing 20-cm long lines with a width of 1 dot on 600 sheets of recording media was recorded continuously in parallel to the conveying direction of the recording media. No recovery operation (pressurization, suction, wiping) was performed during the continuously recording. After continuously recording, a solid image having a recording duty of 10% was recorded to confirm the presence or absence of a non-ejection nozzle. When a non-ejection nozzle appeared, the following recovery operation and viscosity reducing step were performed. Combinations of the recovery operation and viscosity-reducing step are shown in Table 2. After completion of the recovery operation, a solid image was recorded again to confirm the presence or absence of a non-ejection nozzle.

[Recovery Operation]

i) The valve V1 is closed and the valve V2 is opened, each valve shown in FIG. 5, and suction is performed with the pump P3 while capping the ejection orifice surface H1001.

ii) Without the cap C10 shown in FIG. 5, all the nozzles are swept and suctioned by bringing the tip portion of a tube connected to the pump P3 into contact with the ejection orifice surface H1001.

iii) Suction with the pump P3 is performed while closing both the valve V1 and the valve V2 shown in FIG. 5 and capping the ejection orifice surface H1001. The pressure in the nozzle H100 is reduced and the valve V2 is opened.

iv) The valve V1 is closed and the valve V2 is opened, each valve shown in FIG. 5, and pressurization is performed with the pump P1.

v) The ejection orifice surface H1001 is wiped with the wiper W1001 shown in FIGS. 4A and 4B, with the proviso that the recovery operation for causing the ink in the nozzle to flow is not performed.

vi) Neither of the recovery operation by wiping nor that by causing the ink to flow is performed and preliminary ejection of 16 ink droplets is performed for every recording of one sheet.

[Ink Viscosity Reducing Step]

a) According to the procedure shown in FIG. 9, immediately before the recovery operation, the ink in the nozzle was heated by an ink ejection heater to such an extent that it did not cause ejection of the ink. Then, the recovery operation was performed while thermally insulating the ink in the nozzle by a sub-heater provided in the recording head. Immediately after completion of the recovery operation, thermal insulation of the ink in the nozzle was finished.

b) According to the procedure shown in FIG. 9, immediately before the recovery operation, the ink in the nozzle was oscillated by generating a pressure to such an extent that it did not cause ejection of the ink. The pressure was generated by using a line head equipped with a piezoelectric material and displacing the piezoelectric material by an applied voltage. After the ink in the nozzle was oscillated, the recovery operation was performed. Immediately after completion of the recovery operation, voltage application to the piezoelectric material was stopped to stop the oscillation.

c) In the procedure shown in FIG. 9, the recovery operation was performed without performing the thermal insulation of S33.

d) In the procedure shown in FIG. 9, the recovery operation was performed while performing neither the heating of S29 nor the thermal insulation of S33.

In the evaluation of the recoverability in Reference Examples 1 to 3, an ink jet recording apparatus and evaluation inks similar to those described above except that the line head was replaced with a serial head (ink jet recording apparatus similar to "PIXUS iP3100", trade name) were used. Ruled lines having a width of one dot and a length of 20 cm were continuously recorded in a direction orthogonal to the conveying direction of the recording media by bi-directional scanning corresponding to 600 recording heads subject to ejection of the ink from one nozzle. During this recording, preliminary ejection of 16 ink droplets was performed whenever 600 ruled lines were recorded at a position not facing with and both side of the recording media. The recoverability was evaluated in a manner similar to those of the ink jet recording apparatus equipped with the line head except the above-described operation.

The above-described operations were repeated until the recovery of all the nozzles and the recoverability was evaluated based on the following evaluation criteria.

A: All the nozzles recovered by performing the recovery operation 5 times or less.

B: All the nozzles recovered by performing the recovery operation 6 times or more to 10 times or less.

C: After the recovery operation was performed 10 times, a non-ejection nozzle was found.

TABLE 2

Evaluation conditions and results of recoverability

| | | | Evaluation of image | | | | Viscosity | |
|---|---|---|---|---|---|---|---|---|
| | | Ink | Optical density | Fixability | Recording head | Recovery operation | reducing step | Recoverability |
| Examples | 1 | 1 | A | AA | Line | i | a | A |
| | 2 | 1 | A | AA | Line | ii | a | A |
| | 3 | 1 | A | AA | Line | iii | a | A |
| | 4 | 1 | A | AA | Line | iv | a | B |
| | 5 | 1 | A | AA | Line | i | b | A |
| | 6 | 2 | A | AA | Line | i | a | A |
| | 7 | 3 | A | AA | Line | i | a | A |
| | 8 | 4 | A | AA | Line | i | a | A |
| | 9 | 5 | A | AA | Line | i | a | A |
| | 10 | 6 | A | AA | Line | i | a | A |
| | 11 | 7 | A | AA | Line | i | a | A |
| | 14 | 8 | B | AA | Line | i | a | A |
| | 13 | 9 | B | AA | Line | i | a | A |
| | 12 | 10 | A | AA | Line | i | a | A |
| | 15 | 11 | A | AA | Line | i | a | A |
| | 16 | 12 | A | AA | Line | i | a | A |
| | 17 | 13 | A | A | Line | i | a | A |
| | 18 | 14 | A | A | Line | i | a | A |
| | 19 | 15 | B | AA | Line | i | a | A |
| | 20 | 16 | A | AA | Line | i | a | A |
| | 21 | 17 | A | AA | Line | i | a | A |
| | 22 | 18 | A | AA | Line | i | a | B |
| | 23 | 19 | A | AA | Line | i | a | A |
| | 24 | 20 | A | B | Line | i | a | A |
| | 25 | 21 | A | A | Line | i | a | A |
| | 26 | 22 | A | A | Line | i | a | A |
| | 27 | 23 | A | AA | Line | i | a | A |
| | 28 | 24 | A | AA | Line | i | a | A |
| | 29 | 25 | A | AA | Line | i | a | A |
| Comparative Examples | 1 | 26 | C | AA | Line | i | a | A |
| | 2 | 27 | A | C | Line | i | a | A |
| | 3 | 1 | A | AA | Line | i | c | C |
| | 4 | 1 | A | AA | Line | i | d | C |
| | 5 | 1 | A | AA | Line | ii | d | C |
| | 6 | 1 | A | AA | Line | iii | d | C |
| | 7 | 1 | A | AA | Line | iv | d | C |
| | 8 | 1 | A | AA | Line | v | a | C |
| | 9 | 1 | A | AA | Line | vi | a | C |
| Reference Examples | 1 | 1 | A | AA | Serial | i | d | A |
| | 2 | 26 | C | AA | Serial | i | d | A |
| | 3 | 27 | A | C | Serial | i | d | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-109999, filed Jun. 1, 2016, and Japanese Patent Application No. 2017-100598, filed May 22, 2017, which are hereby incorporated by reference herein in their entirety.

What is claimed is:

1. An ink jet recording method that records an image, the method comprising:
   preparing an aqueous ink comprising a pigment for application onto a recording medium using an ink jet recording apparatus equipped with (i) a line head having a nozzle for ejecting the aqueous ink, and (ii) a recovery mechanism for recovering an ejection state of the aqueous ink from the nozzle;
   causing the aqueous ink to flow in the nozzle by operating an ink flow mechanism that is included with the recovery mechanism;
   reducing a viscosity of the aqueous ink in the nozzle by heating the aqueous ink at the time of causing the aqueous ink to flow in the nozzle by operating the ink flow mechanism;
   ejecting the aqueous ink from the nozzle; and
   recovering the ejection state of the aqueous ink from the nozzle using the recovery mechanism,
   wherein the pigment has an average particle diameter of 80 nm or more, and
   wherein the aqueous ink has a dynamic surface tension of 55 mN/m or less at a lifetime of 10 milliseconds.

2. The ink jet recording method according to claim 1, wherein the viscosity of the aqueous ink in the nozzle is reduced by further oscillating the aqueous ink at the time of operating the ink flow mechanism.

3. The ink jet recording method according to claim 1, wherein the ink flow mechanism comprises a mechanism for causing the aqueous ink in the nozzle to flow by pressurization.

4. The ink jet recording method according to claim 1, wherein the ink flow mechanism comprises a mechanism for causing the aqueous ink in the nozzle to flow by suction.

5. The ink jet recording method according to claim 4, wherein the suction is performed by reducing a pressure of the nozzle with closing an ink supply path communicating with the nozzle, followed by opening the ink supply path.

6. The ink jet recording method according to claim 1, wherein the aqueous ink has a dynamic surface tension of 47 mN/m or less at a lifetime of 10 milliseconds.

7. The ink jet recording method according to claim 1, wherein a content (% by mass) of the pigment in the ink is 2.00% by mass or more to 10.00% by mass or less based on a total mass of the ink.

8. The ink jet recording method according to claim 1, wherein the aqueous ink further comprises a surfactant.

9. The ink jet recording method according to claim 8, wherein the surfactant comprises an acetylene glycol-based surfactant.

10. The ink jet recording method according to claim 8, wherein a content (% by mass) of the surfactant in the ink is 0.25% by mass or more to 3.00% by mass or less based on the total mass of the ink.

11. The ink jet recording method according to claim 1, wherein the aqueous ink further comprises a water-soluble organic solvent having a surface tension of 40 mN/m or less.

12. The ink jet recording method according to claim 11, wherein the water-soluble organic solvent comprises at least one of (i) glycol ether and (ii) 1,2-alkane diol.

13. An ink jet recording apparatus to be used in the ink jet recording method according to claim 1, the ink jet recording apparatus comprising:
   (a) an aqueous ink comprising a pigment;
   (b) a line head having a nozzle for ejecting the aqueous ink with which the nozzle is filled; and
   (c) a recovery mechanism for recovering an ejection state of the aqueous ink from the nozzle,
   wherein the pigment has an average particle diameter of 80 nm or more,
   wherein the aqueous ink has a dynamic surface tension of 55 mN/m or less at a lifetime of 10 milliseconds,
   wherein the recovery mechanism includes an ink flow mechanism for making the aqueous ink in the nozzle to flow, and
   wherein the apparatus further comprises a unit for reducing a viscosity of the aqueous ink in the nozzle at the time of operating the ink flow mechanism.

14. The ink jet recording method according to claim 1, wherein the recovery mechanism further comprises a wiper for wiping an ejection orifice surface of the line head.

15. The ink jet recording method according to claim 1, further comprising performing a preliminary ejection based on preliminary ejection data.

16. The ink jet recording method according to claim 1, wherein the pigment has an average particle diameter of 200 nm or less.

17. The ink jet recording method according to claim 1, wherein the aqueous ink has a dynamic surface tension of 30 mN/m or more at a lifetime of 10 milliseconds.

* * * * *